US008080191B2

(12) United States Patent
Sequeira et al.

(10) Patent No.: US 8,080,191 B2
(45) Date of Patent: Dec. 20, 2011

(54) EXTRUDABLE POLYETHYLENE TEREPHTHALATE BLEND

(75) Inventors: Clarence Sequeira, New Milford, CT (US); Said Farha, Pleasantville, NY (US)

(73) Assignee: PepsiCo, Inc., Purchase, NY (US)

( * ) Notice: Subject to any disclaimer, the term of this patent is extended or adjusted under 35 U.S.C. 154(b) by 464 days.

(21) Appl. No.: 11/875,211

(22) Filed: Oct. 19, 2007

(65) Prior Publication Data

US 2008/0093777 A1  Apr. 24, 2008

Related U.S. Application Data

(60) Provisional application No. 60/853,187, filed on Oct. 20, 2006.

(51) Int. Cl.
*B29C 47/00* (2006.01)
(52) U.S. Cl. .......... 264/37.26; 264/37.1; 264/37.25; 528/271; 528/272; 528/308.3; 528/502 R; 528/503; 428/480; 525/55; 525/191; 525/197; 525/221; 525/510; 422/131; 422/245.1; 521/40; 521/48
(58) Field of Classification Search .......... 528/271, 528/272, 308.3, 312, 480, 502 R, 503; 264/510, 264/37.1, 37.25, 37.26; 525/55, 191, 197, 525/221; 428/480; 422/131, 245.1; 521/40, 521/48
See application file for complete search history.

(56) References Cited

U.S. PATENT DOCUMENTS

| 4,132,707 A | 1/1979 | Borman |
| 4,145,466 A | 3/1979 | Leslie et al. |
| 4,219,527 A | 8/1980 | Edelman et al. |
| 4,223,125 A | 9/1980 | Bier et al. |
| 4,223,128 A | 9/1980 | Halek et al. |
| 4,554,328 A | 11/1985 | Sinker et al. |
| 4,629,598 A | 12/1986 | Thompson |
| 4,644,049 A | 2/1987 | Tung et al. |
| 4,814,426 A | 3/1989 | Utsumi et al. |
| 4,880,860 A | 11/1989 | Blocker |
| 4,988,279 A | 1/1991 | Belcher |
| 4,999,388 A | 3/1991 | Okamoto |
| 5,000,991 A | 3/1991 | Hayashi et al. |
| 5,091,459 A | 2/1992 | Howe |
| 5,110,844 A | 5/1992 | Hayashi et al. |

(Continued)

FOREIGN PATENT DOCUMENTS

CH    678184 A5    3/1989

(Continued)

OTHER PUBLICATIONS

Partial European Search Report for EP 07 25 4147, mailed Dec. 4, 2008.

(Continued)

*Primary Examiner* — James J Seidleck
*Assistant Examiner* — Frances Tischler
(74) *Attorney, Agent, or Firm* — Banner & Witcoff, Ltd.

(57) ABSTRACT

A polymer blend has a base and blend components. The base and blend components could be a branched slow crystallizing PET and a faster crystallizing PET, respectively. The ratio of base and blend components result in a block copolymer, the melt processing time and branching or chain extender levels can be can be tailored to impart the polymer blend with sufficient melt strength and crystallization rates, such that it is slow enough during the blow molding process to produce a clear article and yet fast enough during the subsequent PET recycling process making it suitable for extrusion processes as well as for recycling. The combination of materials can be used to form monolayer or multilayer articles.

6 Claims, 34 Drawing Sheets

U.S. PATENT DOCUMENTS

| | | | |
|---|---|---|---|
| 5,128,383 | A | 7/1992 | Amano et al. |
| 5,134,028 | A | 7/1992 | Hayashi et al. |
| 5,137,790 | A | 8/1992 | Cox et al. |
| 5,149,485 | A | 9/1992 | Belcher |
| 5,229,432 | A | 7/1993 | Muschiatti |
| 5,283,295 | A | 2/1994 | Light et al. |
| 5,288,764 | A | 2/1994 | Rotter et al. |
| 5,310,799 | A | 5/1994 | Carson et al. |
| 5,314,987 | A | 5/1994 | Kim et al. |
| 5,319,128 | A | 6/1994 | Dupont et al. |
| 5,376,735 | A | 12/1994 | Sublett |
| 5,436,056 | A | 7/1995 | Takiyama et al. |
| 5,508,316 | A | 4/1996 | Nakamura et al. |
| 5,756,578 | A | 5/1998 | Hanes |
| 6,228,302 | B1 | 5/2001 | Al Ghatta |
| 6,245,863 | B1 | 6/2001 | Al Ghatta |
| 6,350,822 | B1 | 2/2002 | Van Diepen et al. |
| 6,409,949 | B1 | 6/2002 | Tanaka et al. |
| 6,447,711 | B1 | 9/2002 | Al Ghatta et al. |
| 6,469,078 | B1 | 10/2002 | Simon et al. |
| 6,569,991 | B2 | 5/2003 | Nichols et al. |
| 6,586,558 | B2 * | 7/2003 | Schmidt et al. ............... 528/271 |
| 6,604,848 | B2 | 8/2003 | Tanaka et al. |
| 6,632,493 | B1 | 10/2003 | Hildebrand, IV et al. |
| 6,803,082 | B2 | 10/2004 | Nichols et al. |
| 6,984,694 | B2 | 1/2006 | Blasius, Jr. et al. |
| 7,129,317 | B2 | 10/2006 | Moore et al. |
| 7,214,742 | B2 | 5/2007 | Bolle et al. |
| 7,226,648 | B2 | 6/2007 | Al Ghatta et al. |
| 7,294,671 | B2 | 11/2007 | Bheda et al. |
| 7,297,755 | B2 | 11/2007 | Shelby et al. |
| 2003/0039779 | A1 | 2/2003 | Share et al. |
| 2003/0144402 | A1 | 7/2003 | Schenck |
| 2006/0043646 | A1 | 3/2006 | Kobayashi et al. |
| 2006/0287479 | A1 * | 12/2006 | Crawford et al. ............ 528/302 |
| 2007/0071930 | A1 | 3/2007 | Shelby et al. |
| 2007/0173629 | A1 * | 7/2007 | Shiga et al. .................. 528/272 |

FOREIGN PATENT DOCUMENTS

| | | | |
|---|---|---|---|
| DE | 3723758 | A1 | 1/1988 |
| EP | 0040134 | A1 | 11/1981 |
| EP | 0190040 | A2 | 8/1986 |
| EP | 0475142 | A3 | 3/1992 |
| EP | 0569153 | A2 | 11/1993 |
| EP | 0572682 | A1 | 12/1993 |
| EP | 1736509 | A1 | 12/2006 |
| EP | 1818352 | A1 | 8/2007 |
| EP | 1111006 | A1 | 10/2007 |
| GB | 1419049 | | 12/1975 |
| WO | 9010667 | A1 | 9/1990 |
| WO | 9325619 | | 12/1993 |
| WO | 9412564 | | 6/1994 |
| WO | 9833837 | A1 | 8/1998 |

OTHER PUBLICATIONS

Partial European Search Report for EP 07254147 completed Jan. 29, 2009.

Kumaravel, G. and Jabarin, S.A., "Extrusion Blow Molding of High-Density Polyethylene-Poly(Ethylene Terephthalate) Blends," Advances in Polymer Technology, vol. 15, No. 3, pp. 191-204 (1996).

J.S. Forsythe et al., "Rheological Properties of High Melt Strength Poly(ethylene terephthalate) Formed by Reactive Extrusion," Journal of Applied Polymer Science, vol. 100, 3646-3652 (2006).

"Mechanical Behavior of High Polymers," Interscience Publishers, vol. VI (1948), pp. 267-339.

F. Awaja et al., "Review Recycling of PET," European Polymer Journal 41 (2005) 1453-1477.

Annex to PCT/ISA/206 for PCT/US2009/040969 dated Jul. 17, 2009.

Database WPI Week 200636, Thomson Scientific, London, GB: AN 2006-347148 XP002535492 & JP 2006 124451 A (Toyobo KK) May 18, 2006.

Awaja F. et al., "The effect of chain extension on the thermal behaviour and crystallinity of reactive extruded recycled PET", Journal of Thermal Analysis and Calorimetry, Kluwer Academic Publishers, DO, vol. 78, No. 3, Jan. 1, 2004, pp. 865-884.

Rosu, R. F., et al., "Shear rheology and thermal properties of linear and branched poly(ethylene terephthalate) blends" Polymer, Elsevier Science Publishers B.V., GB, vol. 40, No. 21, Oct. 1, 1999, pp. 5891-5898.

* cited by examiner

EXTRUDABLE POLYETHYLENE TEREPHTHALATE BLEND

BACKGROUND

Polymer resins, such as PET, are widely used in the packaging industry. PET is a linear, thermoplastic polyester resin. The myriad advantages of PET include toughness, clarity, good barrier properties, lightweight, design flexibility, chemical resistance and good shelf-life performance. Furthermore, PET is environmentally friendly since it can be recycled. These characteristics of PET make it a popular material in the manufacturing of containers, for example, beverage bottles.

PET beverage bottles are commonly formed using extrusion blow molding (EBM). EBM includes extruding a polymer resin in a softened state through an annular die to form a parason. The parason is placed in a hollow blow mold having a cavity corresponding to the desired shape of the bottle. Air is injected to inflate the parason against the interior walls of the blow mold. Upon contact with the walls, the parason cools instantaneously and permanently assumes the shape of a bottle.

To form beverage bottles, "bottle grade" PET having an inherent viscosity (I.V.) of about 0.72-0.84 dl/g, is typically used. Bottle grade PET has linear polymer chains and can not be used in the production of larger containers such as handleware because of poor melt strength. Low melt strength results in the inability to form a parason. If a parason is not properly formed, the molten parason is drawn down by its own weight, resulting in an hour-glass shape. Parason sagging results in poor material distribution in the walls of the resultant container and an uncontrollable blow molding process.

To counteract the problem of parason sagging, high molecular weight PET having an I.V. of 1.0 dl/g or greater, can be used. The average molecular weight of a resin reflects the average length of polymer chains present therein. In general, melt strength increases with chain length and, thereby, molecular weight. However, higher I.V. requires higher processing temperatures. Higher temperatures cause the resin to thermally degrade resulting in more yellowness in finished parts. The process window narrows making it difficult to run a stable blow molding operation over an extended period. Moreover, longer chain lengths are more susceptible to shear and thermal degradation. These resins also tend to be more expensive than bottle grade PET resin commonly used to produce beverage container packaging, increasing manufacturing cost.

An alternate solution is to use branched PET copolymers. An example is the Eastar Copolyester EB062, manufactured and marketed by Eastman Chemical Company. EB062 is a branched version of a highly modified CHDM (1,4-Cyclohexanedimethanol) copolymer of PET having an I.V. of 0.75 dl/g. Branching effectively increases the melt strength of the resin. Copolymer used in this resin suppresses crystallization producing high clarity while allowing the resin to be processed at lower temperatures. Lower processing temperatures results in higher melt viscosity which in turn serves to improve process stability in extrusion blow molding. Unfortunately, the high levels of copolymers suppress the rate of crystallization to such a level resulting in a virtually amorphous resin affecting recyclability. Amorphous resins, added to the PET recycling stream, causes sticking, agglomeration and bridging issues during the drying process. Amorphous PET when melt processed with bottle grade PET negatively impacts the performance of the recycled resin by suppressing crystallinity and melt temperature, while increasing dye uptake, and reducing physical properties such as hardness, tensile and flexural properties. The severity of the undesirable effects bears a direct relationship to the percentage of amorphous PET content in melt processed recycled PET. As a result, PET copolymers, such as the EB062 are not recyclable at higher concentrations in the PET recycle stream as these resins are more widely used for extrusion blowmolding.

From the foregoing discussion, it is desirable to provide PET blend resins useful for extrusion blow molding and which can be easily recycled.

SUMMARY

The present invention relates generally to polymer resins. More particularly, the present invention relates to polyester blend resins suitable for extrusion processing such as extrusion blow molding. In one aspect, a polyester blend comprises a slow crystallizing polyester copolymer base component and a crystallizable polyester component, wherein the polyester blend is capable of forming extruded articles having good clarity and recyclability. The PET-based copolyester may be a branched CHDM modified PET (PETG) or an IPA modified slower crystallizing PET. An effective amount of the crystallizable polyester component is added to the base component to impart the polymer blend resin with sufficient melt strength and a faster crystallization rate. In one embodiment, the melt strength of the polymer blend is at least about 1,500 Pa·s. The polyester blend should also have sufficient crystallinity to reduce sticking and agglomeration, which makes the polyester blend conducive to recycling.

In one embodiment, a polyester-based copolymer, such as PET-based copolyester is provided as the base component. The PET-based copolyester, for example, comprises branched slow crystallizing PET. The base and crystallizable polyester components are mixed and processed to form the polyester blend. An effective amount of the crystallizable polyester component is provided such that the formed polymer resin is imparted with a sufficient melt strength which makes it suitable for extrusion. The base and blend components may be pre-compounded as separate step, dried and introduced into the extruder of an EBM machine. The melt strength of the blend may be enhanced, for example by the addition of a chain extender and/or branching agent in the precompounding stage.

In one aspect the base copolyester and the additional crystallizable polyester component may be melt blended immediately as it exits a polymerization vessel at a manufacturer's location. An alternate approach could involve the base copolyester and crystallizable PET component being dried thoroughly to very low moisture levels and then melt blended as a single component to be used in extrusion blowmolding. The viscosity of the blend may be enhanced by the addition of a chain extender and/or branching agent. This type of additive may be added along with the two resin components at the beginning of the mixing process or during a later or final stage of the mixing process. Alternately, the chain extender could added as an additive along with the precompounded blend at the throat of the extruder used in the extrusion process to form the extrusion blow molded (EBM) container.

The blend formulated as described would lend itself to transesterification. This unique feature of this blend allows the formation of a block copolymer with a critical length of the crystalline block units and amorphous component. The length of the alternating block sequence of the crystalline PET is optimized to meet the requirements for processability in three critical operations. In the first instance, the proportion of crystalline and amorphous ingredients used in the blend formulation as well as the total melt process time and temperature result in a resin pellet or chip with a suitable rate and extent of crystallization to allow the amorphous quenched pellet that is extruded from the extruder to form a crystalline skin under suitable conditions. The crystalline skin formed during the crystallization process is adequate to allow for subsequent drying in a conventional desiccant drier. This is a key advantage allowing the blended PET pellet or chip to be dried under conditions similar to those used for a crystalline resin. The extent of drying possible is many times lower than that possible for amorphous extrudable PET compositions that are commercially available. During the next phase of melt processing needed to extrusion blow mold a container from this unique PET formulation transesterification continues. The extent of transesterification during the second melt history which is a function of melt time and temperature allows further randomization of crystalline blocks resulting in more suppressed rate of crystallization. Nevertheless, the length of the crystalline blocks to long enough that the rate of suppressed crystallization does not allow adequate crystallinity to result in haze in the container wall or thickened pinch-off sections. During the process the extruded melt travels through the die head forms the parason and is quenched forming the blown container, a total time of under a minute. On the other hand, of crystalline block repeat units are long enough to prevent drying in subsequent PET recycling processes. As well known to those skilled in the art, recycled PET containers are ground washed and dried. The drying process, which is typically done at 160° C. for a duration of four hours, would allow adequate crystallinity to be developed in the ground flake to prevent sticking or clumping at levels exceeding 20% in recycled PET. Drying without sticking is not possible with current amorphous extrudable PET grades.

In another aspect, an extrusion process comprising adding a slow crystallizing polyester copolymer base component, a crystallizable polyester component, and a chain extending or branching agent directly to an extruder either as separate components or as coextruded pellets with the crystalline component on the outside. The components are extruded to form an extruded article.

In another aspect, a multilayer extruded article having good clarity and recyclability may be prepared by co-extruding inner and outer crystallizable polyester layers and an intermediate layer comprising a slower crystallizing polyester copolymer. The intermediate layer may comprise a compounded polyester blend comprising the slow crystallizing polyester copolymer base component and a crystallizable polyester component.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

The polyester blends have sufficient melt strength to enable them to be used in an extrusion process, such as an extrusion blowmolding (EBM) process. The polyester blend should also have sufficient crystallinity to reduce sticking and agglomeration, making the polymer blend conducive to recycling. Various types of containers can be formed with the PET blend using EBM process. For example, beverage or food containers of various sizes and shapes can be formed using the PET blend, including containers from a few ounces up to or greater than 5 gallons as well as handleware type containers. The extrudable PET blend resin can also be used to form small or regular-sized containers or bottles, such as beverage bottles.

Figure 1A:
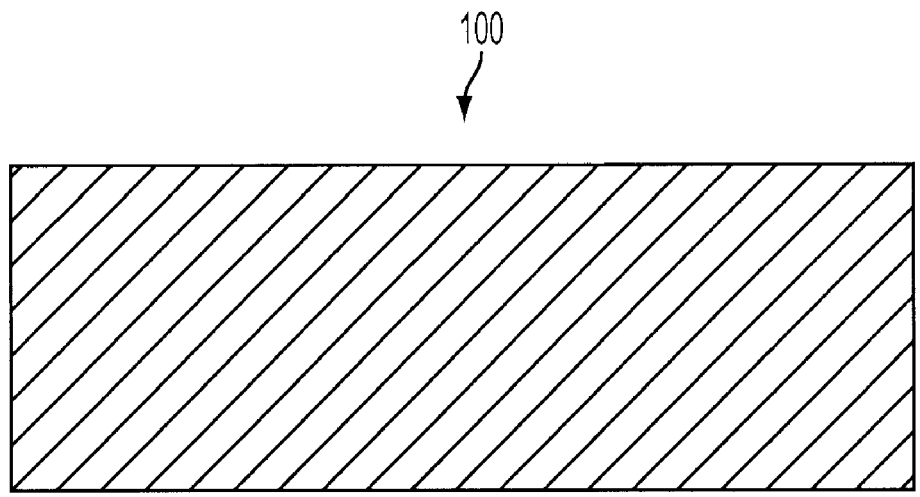
FIGS. 1a-b show cross-sectional views of extrudable PET resins in accordance with embodiments of the invention.
Figure 1B:
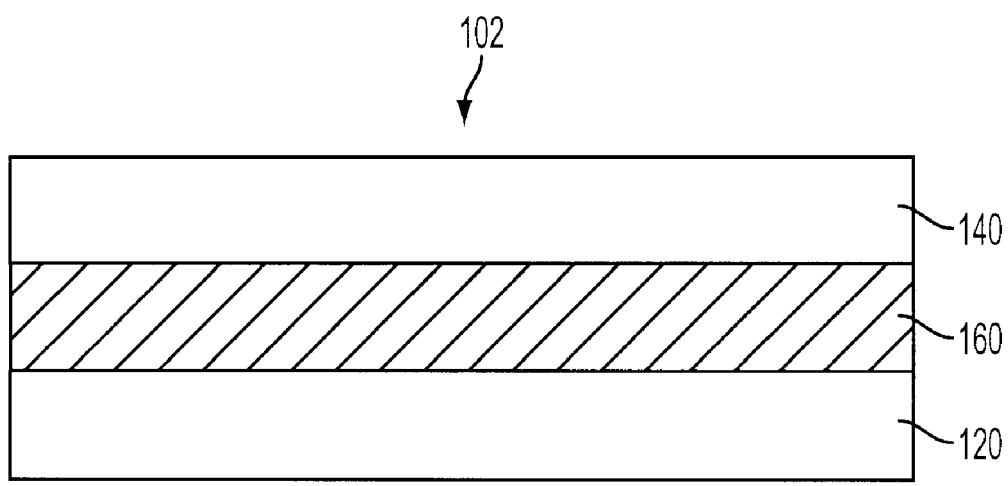

FIGS. 1a-b show polymer structures in accordance with various embodiments of the invention. Referring to FIG. 1a, a polymer structure 100 comprising a mono-layer structure is shown. The mono-layer structure comprises a polymer blend which includes base and blend components. The polymer blend has sufficient melt strength suitable for extrusion. Melt strength is analogous as zero shear viscosity as commonly understood in the art. For example, the melt strength of polymer blend is at least 1,500 Pa·s. In one embodiment, the melt strength of the polymer blend is from about 1,500-20,000 Pa·s. In one embodiment, the melt strength of the polymer blend is from about 2,000-10,000 Pa·s. In one embodiment, the melt strength of the polymer blend is from about 4,000-

10,000 Pa·s. The thickness of the polymer structure can be about, for example, 0.25 to 1.27 mm (10-50 mils). Other thicknesses may also be useful, for example, depending on the size of the container formed.

The polymer blend, in one embodiment, further comprises sufficient crystallinity to facilitate recycling. For example, the crystallinity of the polymer blend should reduce sticking, agglomeration and/or bridging issues which can occur during the drying process in the recycling stream. Typically, the crystallinity of the polymer blend can be from about 3 to 40%, usually greater than about 10% or 12%, and often from about 15 to 30%. In one embodiment, the base component comprises a polyester-based copolymer. The polyester-based copolymer can be PET-based. In one embodiment, the polyester-based copolymer comprises CHDM-modified PET copolyester. Preferably, the polyester-based copolymer comprises a branched version of the PET copolyester. One such branched PET copolyester is commercially available from, for example, Eastman Chemical Company as grade Eastar Copolyester EB062, EB062 has an I.V. of about 0.75 dl/g and is essentially an amorphous copolyester material, with a crystallinity of less than 15% even after long periods under isothermal heating. Other types of branched copolyesters with suppressed crystallinity can also be used.

The crystallizable polyester component, in one embodiment, comprises a bottle grade PET. Generally, bottle grade PET refers to PET with low copolymer modification, resulting in a faster crystallizing semi-crystalline resin. Bottle grade PET, for example, has an I.V. of about 0.72-0.86 dl/g and is commonly used in forming small or regular sized beverage bottles by injection stretch blow molding (ISBM). Various types of bottle grade PET are commercially available, for example, Eastapak PET 9921 or WA314 from Eastman Chemical Company, Invista's 1101 or M&G's 8006.

In an alternative embodiment, the crystallizable polyester component comprises a polyester-based polymer with high molecular weight. The polyester-based polymer comprises a high molecular weight (MW) linear PET resin. The high MW linear PET, in one embodiment, has an I.V. of about 1.25 dl/g. Various types of high MW PETs can be used, for example, DB1 from M&G (Italy). Alternatively, the blend component comprises a modified faster crystallizing PET resin, in one embodiment, is modified by blending bottle grade PET with high MW branched PET. The modified PET comprises, for example, about 60 wt % of the high MW branched PET and, correspondingly, about 40 wt % of bottle grade PET. Other percentages of bottle grade and high MW linear PET are also useful chain extender or branching agent.

In another embodiment, the crystallizable polyester component comprises a modified polyester-based polymer. The modified polyester-based polymer comprises a modified PET. In one embodiment, the PET is modified with chain extenders and/or branching agents. Modifying high MW linear PET or a combination of PET and high MW linear PET with chain extenders and/or crosslinkers is also useful. Chain extenders and branching agents are low molecular weight compounds which comprise two (in the case of chain extenders) or more (in the case of branching agent) reactive functional groups. Reactive functional groups can react with end groups or functional groups in the PET to extend the length of the polymer chains, create light branching, and/or form three-dimensional network with the polymer matrix. This advantageously increases the average molecular weight of the PET and improves its melt strength.

Various compounds are useful as chain extenders or crosslinkers. The degree of chain extension or crosslinking achieved depends on the structure and functionalities of the compounds used. For example, compounds containing di- or multi-functional epoxy (e.g. glycidyl) or anhydride functional groups can be used. These functional groups can react with the hydroxyl or carboxyl groups in PET to extend chain length and/or create branching or cross-linking in the resin. Examples of useful compounds include trimellitic anhydride, pyromellitic dianhydride (PMDA), trimellitic acid and their haloformyl derivatives. Chain branching agents like pentaerythritol or trimethylolpropane may also be used (see U.S. Pat. No. 4,219,527). Commercial chain extenders such as CESA-Extend from Clariant, may also be used.

In one embodiment, about 0.1-5 wt % of active ingredients of the chain extenders and/or crosslinkers of the total weight of the PET are added. Preferably, about 0.1-0.6 wt % of chain extenders and/or crosslinkers is added. The amount of chain extenders and/or crosslinkers added, for example, can vary depending on the type(s) and molecular weight of PET components. In one embodiment, the chain extenders and/or crosslinkers are added before the PET enters the extruder to be formed into a parason.

In yet another embodiment, the bottle grade PET resin is modified at step 222 by irradiating the parason as it emerges from the extruder die head. Branching of the PET chains can be effected in-situ using e-beam initiating agents compounded into the melts and activating the initiators as the molten parason as it emerges from the extruder die head. This can be accomplished, for example, by exposing the molten parason with e-beam radiation as soon as the melt exits the die head. Irradiation results in the formation of active-radical which can react with functional groups in the polymer blend, resulting in branching and consequently higher melt strength.

The base and blend components form major and minor phases in the polymer blend. The polymer blend comprises an effective amount of blend component (minor phase) added to the copolyester (major phase). In one embodiment, about 0.5-45 wt % blend component (minor phase) of the total weight of the polymer blend is added. In another embodiment, about 15-30 wt % blend component (minor phase) of the total weight of the polymer blend is added. The polymer blend can also be provided with other effective amounts of the blend component. For example, the amount of blend component can be tailored to achieve the desired melt strength with desired crystallinity.

Referring to FIG. 1b, a multi-layer polymer structure 100 in accordance with one embodiment of the invention is shown. The multi-layer polymer structure comprises a first layer 120, a second layer 140, and an intermediate layer 160 sandwiched between the first and second layers. The first and second layers can be formed from the same or from different materials. Suitable materials for the first and/or second layers can include, for example, polyester-based polymer or copolymers such as bottle grade PET, high I.V. PET, PETG, branched PETG or a combination thereof. Other materials having sufficient melt strength for extrusion blow molding can also be used. For example, M&G's (Gruppo Mossi & Ghisolfi, Italy) grades DB1 or DB2 or other types of branched copolyesters can be used. The layers can also include regrind material. One of the first or second layers serves as the inner container wall while the other serves as the outer container wall.

The intermediate layer 160 comprises a polymer blend. The polymer blend comprises a polyester-based copolymer and a blend component. In one embodiment, the polyester based copolymer comprises a PET-based copolyester. The polyester-based copolymer comprises PETG and preferably branched PETG, such as Eastar EB062. Other types of branched copolyesters can also be used. The blend component can include, for example, blend components described in FIG. 1a. Such blend components include a polyester-based polymer such as bottle grade PET, high MW linear polyester-based copolymer such as PET, a combination of high MW linear and bottle grade PET, or a modified polyester-based polymer such as modified PET having chain extenders and/or crosslinkers.

The polymer blend resin according to the invention comprises a lower copolymer content and higher crystallinity than the Eastar EB062. In such case, the polymer recycle stream can comprise a higher percentage of the polymer blend resin without affecting the performance of the reclaimed resin.

In another embodiment, the first and second outer layers comprise bottle grade PET sandwiching the polymer blend intermediate layer. Alternatively, the multi-layer structure 100 includes an intermediate layer 160 comprising regrind material. One of the outer layers (e.g., 120) comprises a polymer blend such as that described in FIG. 1a. The other of the outer layers (e.g., 140) comprises, for example, bottle grade PET.

Figure 2:
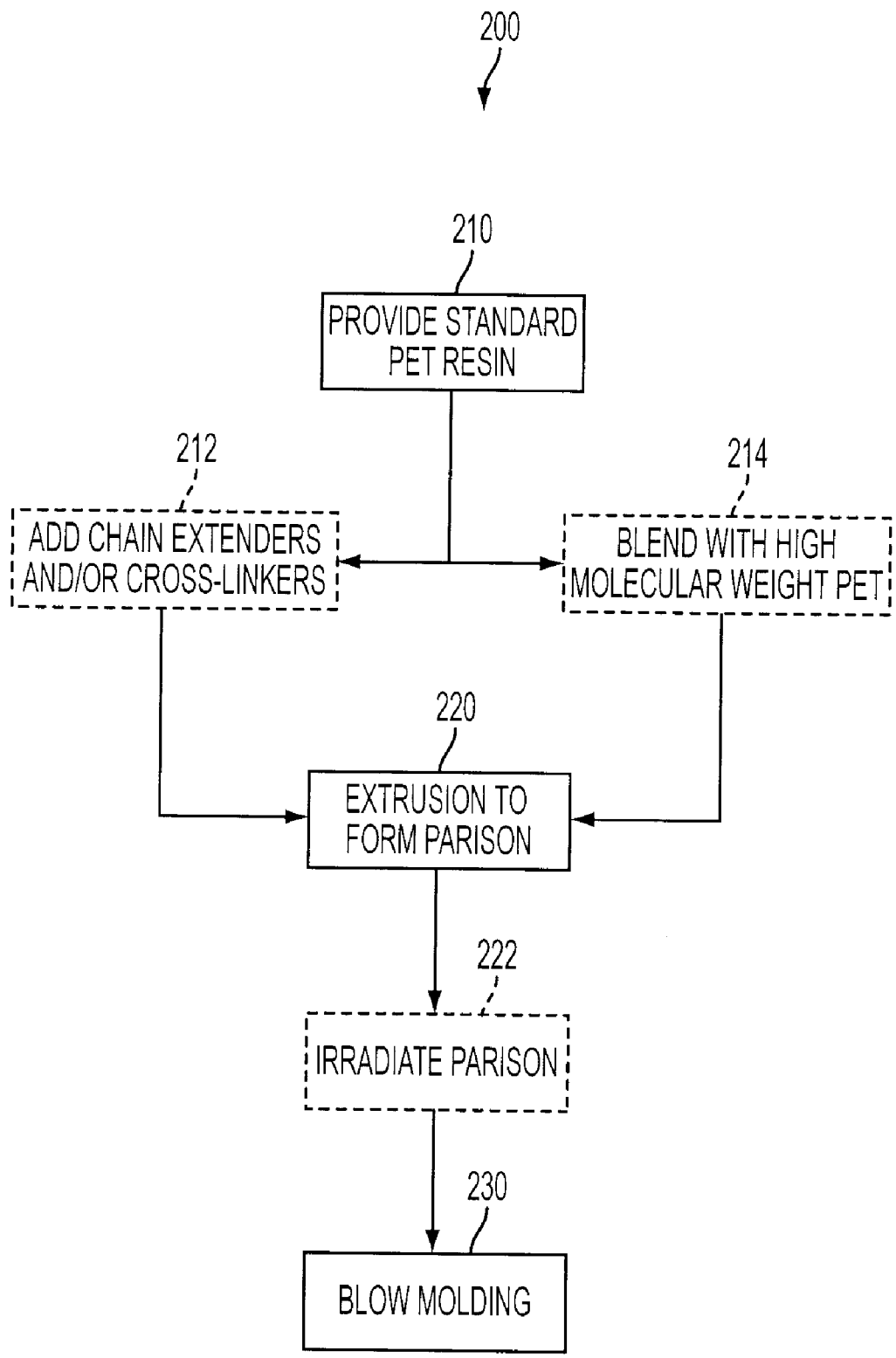
FIG. 2 shows process flows in accordance with different embodiments of the invention.

FIG. 2 shows processes 200 for forming a container comprising extrudable PET resin in accordance with different embodiments of the invention. At step 210, a PET resin is provided. The PET resin, in one embodiment, comprises a bottle grade PET resin having an I.V. of about 0.8-0.84 dl/g. Commercially available PET resins, for example, Invista 1101, or Eastman 9921, can be used. Alternatively, the bottle grade PET resin can be synthesized by reacting terephthalic acid (TPA) and ethylene glycol (EG) in a polycondensation reaction along with branching agents and modifiers to control the crystallization rate in the PET copolymer according to techniques well-known in the art. Molecular weight can be selected by controlling the duration of the solid-state polymerization step. The bottle grade PET resin can be provided in the form of flakes or pellets (collectively "pellets"). High molecular weight PET or a slow crystallizing PET could be added (step 214) to form a pellet blend. Chain extenders or branching agents could also be added (step 212) to the pellet blend. Each component of the pellet blend could be individually dried. This blend could be charged into the main extruder to melt blend and produce a parason as shown in step 220.

At step 220, the bottle grade PET resin is extruded to form a parason. In one embodiment, co-extrusion is performed to form a multi-layer parason. In one embodiment, the bottle grade PET resin is co-extruded with the Eastar Copolyester EB062 to form a parason comprising the multi-layer structure shown in FIG. 1b.

The pellets are usually dried extensively before being fed to the extruder. Moisture, if present in the pellets, promotes hydrolytic degradation of the linear crystallizable PET chains during extrusion or blow molding, resulting in chain scission and a catastrophic drop in I.V. of the resin. Drying can be accomplished by any conventional desiccant dryer. Vacuum drying was also shown to be effective in reducing moisture in resin pellet blends. In addition, a dryer hopper could also be installed at the inlet throat of the extruder to pass hot desiccant air through the pellets before they enter the extruder to ensure maximum dryness. Preferably, moisture levels are less than about 100 ppm. More specifically, moisture levels may be less than about 50 ppm.

Gravimetric or volumetric feeders can be used to control the respective quantities of faster crystallizing grade PET and the slower crystallizing PET copolymer pellets feed to the extruder. Upon entering the extruder, the pellets are heated to above the melting point of PET to soften the resin. In one embodiment, the pellets are heated to above 220° C. The softened resin is extruded through a die head to form a hollow tube. In the case of co-extrusion, multiple layers of resin are extruded concurrently through a die head comprising a plurality of concentric, annular dies to form a multi-layer tube. Typically, the tube is extruded downward between two halves of an open mold. When the tube reaches the proper length, the mold closes, catching and holding the neck end of the tube open and pinching the bottom end closed. The parason is thus formed.

Steps 212, 214 and 222 show alternative ways to modify the bottle grade PET to produce the modified PET of FIG. 1a, according to different embodiments of the invention.

In one embodiment, at step 212, chain extenders and/or crosslinkers are added to the bottle grade PET resin. These compounds promote chain extension, mild crosslinking or branching reactions in the resin, increasing the average molecular weight and, consequently, melt strength of the resin. Commercial chain extenders and/or crosslinkers including, for example, PMDA, trimellitic anhydride from Degussa Corporation, or CESA-Extend from Clariant can be used. These compounds are available in the form of pellets. In one embodiment, the compounds are added at the extruder throat. Gravimetric or volumetric feeders can be used to control the amount added. In one embodiment, about 0.1-5 wt % of chain extenders and/or crosslinkers are added.

In another embodiment, at step 214, the bottle grade PET resin is blended with a high molecular weight linear PET resin before entering the extruder. The high molecular weight or branched PET resin, in one embodiment, has an I.V. of about 1.0 dl/g. For example, DB1 or DB2 from M&G can be used. Alternatively, a slower crystallizing PET copolymer could be added at step 214.

Variations of the above-described processes for producing modified PET are possible. For example, the bottle grade PET may be modified both by chain extenders and/or crosslinkers and by blending with high MW PET. Alternatively, bottle grade PET may be blended with high MW PET and further subject to irradiation to promote branching and crosslinking of polymer chains in the blend.

At step 230, the parason is blow molded to form the container. Here, the parason, in a softened state, is placed in a hollow blow mold having a cavity corresponding to the desired shape of the bottle. Air or other compressed gas is injected to inflate the parason against the interior walls of the blow mold. Upon contact with the walls, the parason cools instantaneously and permanently assumes the shape of a bottle. In one embodiment, extrudable PET with a melt temperature around 240° C. can be blown into a parason using less than 45 psi of blow air.

Figure 3A:
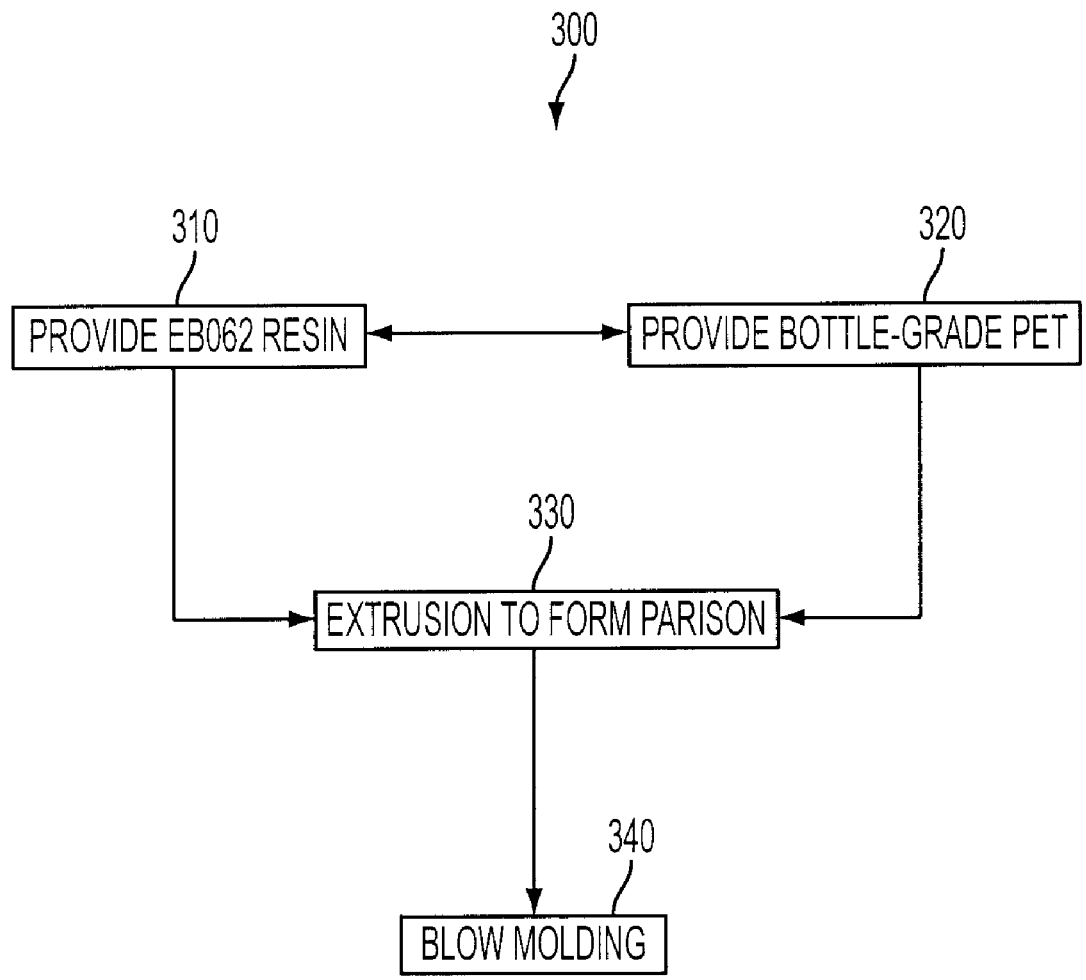
FIG. 3a shows a process flow in accordance with another embodiment of the invention.
Figure 3B:
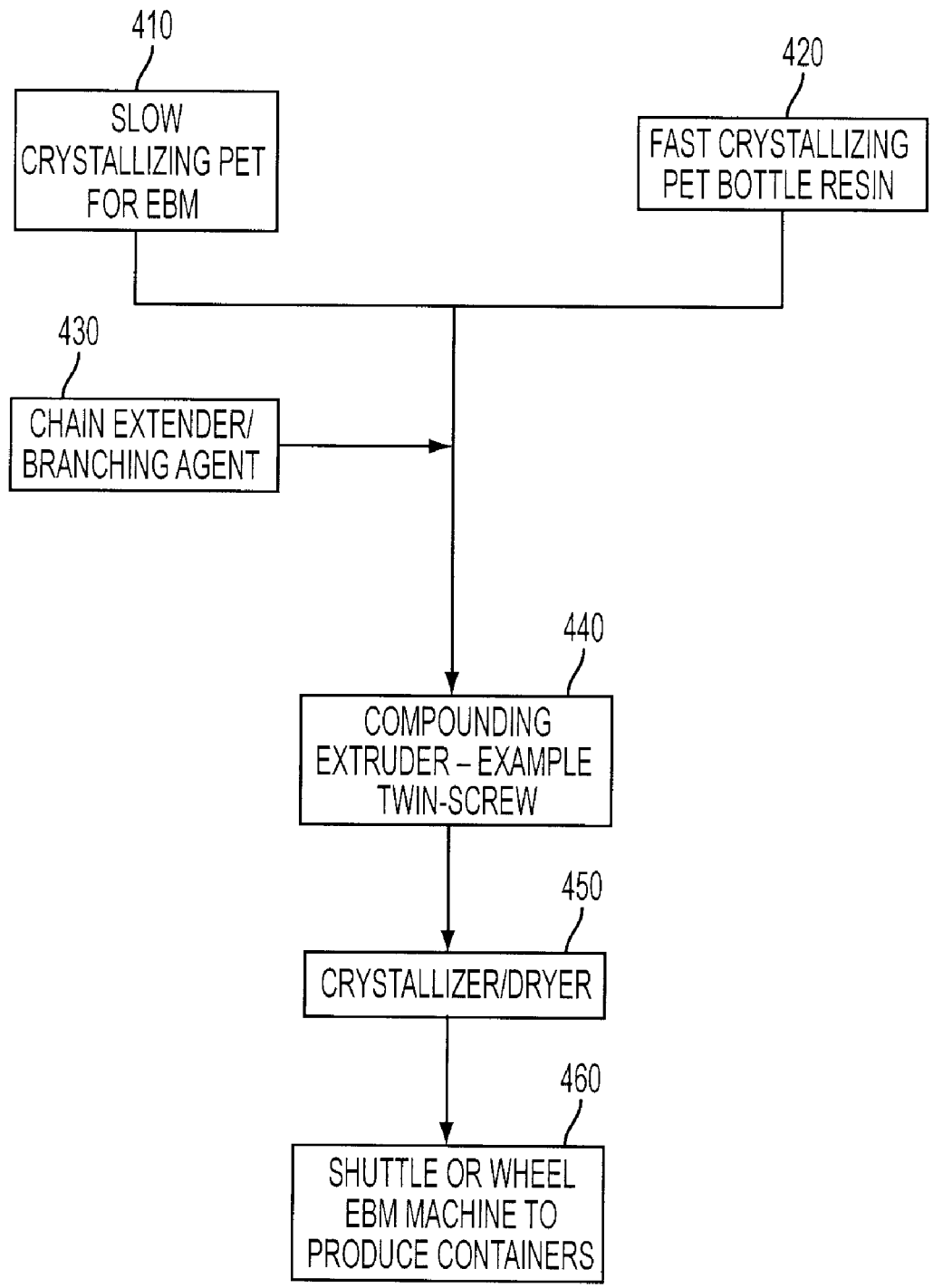
FIG. 3b shows a process flow with another embodiment of the invention.

FIG. 3 shows a process 300 for forming a container comprising the extrudable PET resin in accordance with another embodiment of the invention. At step 310, a slow crystallizing PET copolymer resin is provided. The PET copolymer resin, in one embodiment, comprises the Eastar Copolyester EB062 from Eastman Chemical Company. At step 320, a linear faster crystallizing PET grade is provided. In one embodiment, bottle-grade PET having an I.V. of about 0.76-0.84 dl/g could be added at step 320. Examples are Invista 1101 or 9921 from Eastman Chemical. Alternatively, the bottle-grade PET can be synthesized by the method previously described. The bottle-grade PET is provided in the form of, for example, flakes or pellets.

At step 330, the PET copolymer and bottle-grade PET are fed to an extruder. In one embodiment, the polymers are blended in the extruder. The resins are heated to above their melting temperatures in the extruder and blended by the action of the extruder screw. In one embodiment, the resins are heated to above 245° C. Alternatively, blending may be conducted in a separate mixer or blender before the PET blend is fed to the extruder. In one embodiment, the blend comprises about 85 wt % of EB062 and, correspondingly, about 15 wt % of faster crystallizing bottle-grade PET.

The PET blend is extruded to form a parason. The parason, in one embodiment, comprises a mono-layer structure as shown in FIG. 1a. The extrusion process for forming a parason is similar to as described in connection with FIG. 2. Here, however, the extruder die head comprises a single annular die for forming a mono-layer parason. Finally, at step 340, the parason is blow molded to form a container, as described in connection with FIG. 2.

In alternative embodiment, bi-component pellets can be used to form the extrudable polymer blend resin. The bi-component pellets can be used to form an extrudable PET blend resin. Bi-component pellets include a core comprising a first component of the polymer blend and an outer sheath comprising a second component of the polymer blend covering the core. The sheath could serve as a barrier for protecting the core from exposure to undesirable conditions or elements. In one embodiment, the core comprises polyester-based copolymer and the sheath comprises the blend component of the polymer blend. In one embodiment, the core comprises branched PETG copolyester such as EB062 while the sheath comprises PET or modified PET. Bi-component pellets facilitate processing polymer blends with a single raw material component, which advantageously would eliminate the issues associated with drying a partially crystalline to amorphous materials.

To form bi-component pellets, two extruders or a suitable manifold system that feeds a concentric die can be used. For example, EB062 amorphous resin can be introduced in the middle to form the core and the PET can be introduced in the outer annulus forming the sheath covering the core. The exact weight percentages could be tailored as desired, for example, to produce a partially crystalline PET blend composition that reduces or eliminates clumping in the recycle stream and minimize other issues described earlier. Alternately, bi-component pellets can be formed by adding a lower viscosity crystallizable PET or polyamide to the amorphous EB062 resin. During extrusion of the molten PET blend, the lower viscosity crystallizable species diffuses to the surface to produce a crystallizable skin covering the amorphous core. This would permit better drying of the bi-composite pellet.

The base copolyester and crystallizable PET component could be dried thoroughly too very low moisture levels and then melt blended as a single component in a twin-screw or single screw extruder. The viscosity of the blend could be enhanced by the addition of a chain extender or branching agent. This type of additive may be added along with the two resin components at the beginning of the mixing process or during a later or final stage of the mixing process through down-stream ports on the extruder.

The blend formulated as described would lend itself to transesterification. This unique feature of this blend allows the formation of a block copolymer with a critical length of the crystalline block units and amorphous component. The length of the alternating block sequence of the crystalline PET is optimized to meet the requirements for processability in three critical operations. In the first instance, the proportion of crystalline and amorphous ingredients used in the blend formulation as well as the total melt process time and temperature result in a resin pellet or chip with a suitable rate and extent of crystallization to allow the amorphous quenched pellet that is extruded from the extruder to form a crystalline skin under suitable conditions. The crystalline skin formed during the crystallization process is adequate to allow for subsequent drying in a conventional desiccant drier. This is a key advantage allowing the blended PET pellet or chip to be dried under conditions similar to those used for a crystalline resin. The extent of drying possible is many times lower than that possible for amorphous extrudable PET compositions that are commercially available.

A further advantage to such a crystallizable precompounded blend is evident during the next phase of melt processing needed to extrusion blow mold a container. Amorphous resins are prone to bridging in the throat of the EBM extruder. A partially crystalline blended formulation offers the unique advantage of allowing higher entry zone temperatures while greatly reducing the chance for bridging or plugging the extruder throat facilitating a more stable and reliable process. This is a key advantage that would be appreciated by those skilled in the art.

The extent of transesterification during the second melt history which is a function of melt time and temperature allows further randomization of crystalline blocks resulting in more suppressed rate of crystallization. Nevertheless, the length of the crystalline blocks to long enough that the rate of suppressed crystallization does not allow adequate crystallinity to result in haze in the container wall or thickened pinch-off sections. During the process the extruded melt travels through the die head forms the parason and is quenched forming the blown container, a total time of less than a minute.

Another key advantage is the crystalline block repeat units after the second melt history are long enough to prevent drying in subsequent PET recycling processes. To those skilled in the art, recycled PET containers are ground washed and dried. The drying process which is typically done at 160° C. for four hours would allow adequate crystallinity to be developed in the ground flake to prevent sticking or clumping at levels exceeding 20% in recycled PET. Drying without sticking is not possible with current amorphous extrudable PET grades.

The PET blend is particularly useful in high-throughput machines such as such as rotary wheels blow molding systems ("wheels extrusion systems"). Wheels systems are typically used with fractional to low melt index HDPE & PP resins. These resins have a lower viscosity than PET copolymers such as the EB062. In such case, modifications have to be made to the conventional wheels systems to be compatible with the EB062. These modifications include, for example, providing larger extruders, and redesigning the melt manifolds and extruder die heads to cater to a higher-viscosity resin. By blending the EB062 with bottle-grade PET, according to one embodiment of the invention, viscosity of the EB062 is reduced. The PET blend can then be used in wheels systems without the need for extensive and costly modifications to the machines. Furthermore, machine dedication is not required since conventional systems can now be used with the PET blend.

EXAMPLE 1

This example illustrates the preparation and analysis of PET blend resins. The example examines the difficulty of drying amorphous polyester, the introduction of crystallinity by compounding amorphous polyester with linear crystallizable PET and the effect on viscosity of the blends as a function of temperature.

Materials

Extrusion grade EB062 Eastman PET was melt blended with Eastman 9921 PET in proportions as shown in Table 1.

TABLE 1

Blend compositions prepared

| Composition # | EB062 | 9921 |
|---|---|---|
| 1 | 100 | 0 |
| 2 | 99.5 | 0.5 |
| 3 | 98 | 2 |
| 4 | 90 | 10 |
| 5 | 70 | 30 |
| 6 | 50 | 50 |
| 7 | 30 | 70 |
| 8 | 0 | 100 |

Moisture Analysis

A DuPont solids moisture analyzer (26-321A) was used to monitor levels of moisture present in samples after exposure to various drying conditions. Pellet samples of about one gram were heated for at least one hour at 140° C. or until equilibrium conditions had been obtained. Results were calculated as ppm or micro grams of evolved water per gram of polyester resin.

Thermal Properties

A Perkin-Elmer DSC-7 was used to monitor thermal properties of all resin and blend samples at heating and cooling rates of 10° C. per minute. A nitrogen purge was utilized to prevent oxidation degradation.

Viscosity Analysis

A Rheometrics Dynamic Analyzer, RDA III, was used to evaluate the resin viscosities. The instrument uses parallel plates oscillating at 15% strain with a 1 mm gap and a nitrogen atmosphere. Test conditions include temperatures of 260, 270 and 280° C. and a logarithmic frequency sweep from 1-500 rad/s. The reported viscosity is the complex viscosity in units of Pascal-seconds. Polyester resin samples were dried prior to testing at 115° C. (measured in the actual resin), under vacuum, for at least 16 hours.

Extrusion

Blends and controls were extruded using a Haake Plasticorder 0.75 inch extruder equipped with a strand die and water bath for cooling of the extrudate. Temperatures were maintained at 270° C. in all temperature zones unless otherwise noted, and the screw speed was set at 50 rpm. With a screw speed of 50 rpm, the polymer retention time in the extruder is 1.6 to 2.2 minutes, as determined by timing a visual tracer through the extrusion system. The hopper, in which the dried resin was placed, was blanketed with nitrogen gas in order to keep the resin dry and to prevent oxidative degradation of the extrudate. Torque readings from the extruder were taken during extrusion.

Results and Discussion:

Blends were prepared and materials characterized according to the previously described experimental conditions. Complete descriptions of these evaluations are given under appropriate headings.

Preliminary Drying and Processing Investigations

During initial evaluations of the substantially amorphous EB062 resin, a number of drying and extrusion studies were performed. These experiments were necessary in order to establish conditions under which the material could be dried and extruded without undue sticking and degradation.

Figure 4:
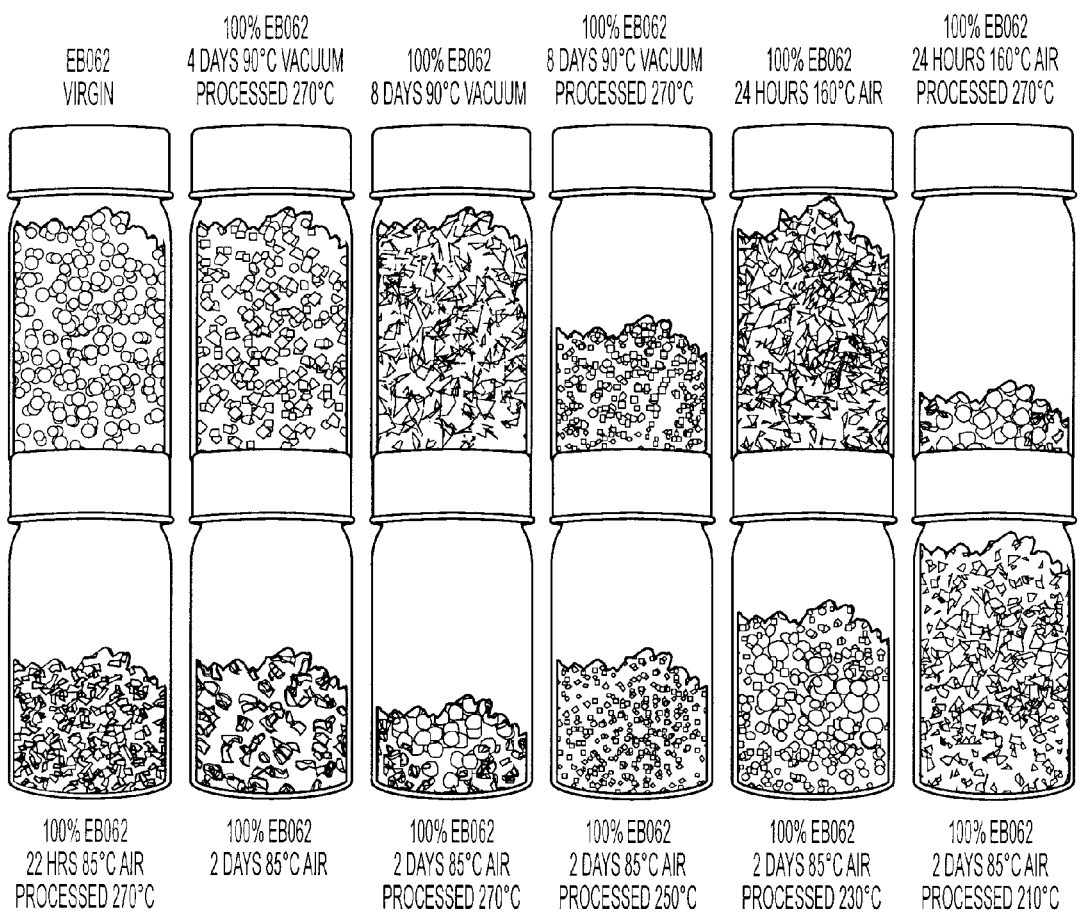
FIG. 4 shows various samples of EB062 after experimentation.

Changes in melt viscosity were recorded in order to establish the effects of moisture contents, drying conditions before extrusion, and extrusion conditions. It was found that air drying for 24 hours at 160° C. resulted in significant degradation of EB062 resin. Extrusion of this resin at 270° C. caused further degradation. FIG. 4 shows a photograph including the 160° C. dried resins before and after extrusion. It is significantly more brownish than the other resins, with less severe drying histories.

Figure 5:
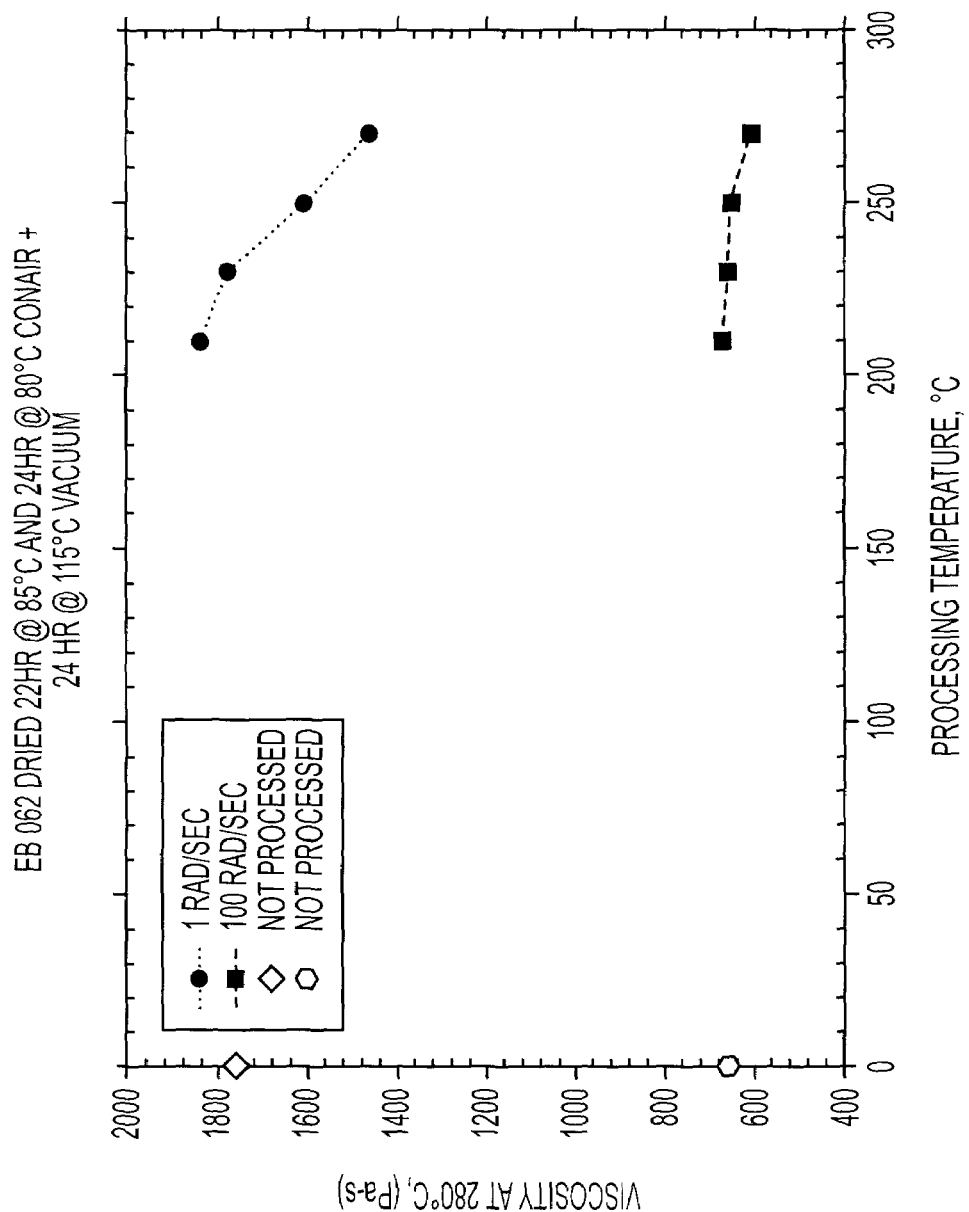
FIG. 5 shows temperature effects on melt viscosity of EB062.

Results shown in FIG. 5 also indicate that exposing EB062 to increased processing temperature results in decreased melt viscosity at the 280° C. measurement temperature.

Blending Experiments

As a result of the preliminary drying and extrusion experiments, uniform drying and blending conditions were established for preparation of subsequent materials. Resins were vacuum dried at 90° C. for at least 16 hours. Processing of these dried materials, at each composition listed on Table 1 was then performed at 270° C. under a nitrogen purge. Levels of moisture before processing were maintained near 100 ppm or less. Extruder torque for unblended EB062 was about 2250 in-lbs, while that for pure PET was about 3100 in-lbs. Values for all blends range between 2400-2600 in-lbs.

Thermal Evaluations

Virgin resins, extruded unblended control resins, and prepared blends were vacuum dried overnight at 160° C., in order to determine relative crystallization responses to this temperature condition. The samples were then heated at 10° C. per minute in the DSC in order to record melting endotherms resulting from the thermal exposure. Table 2 lists peak endotherm temperatures and heats of fusion for all materials at the compositions indicated.

TABLE 2

| | | | Melting Endotherms | | | | | |
|---|---|---|---|---|---|---|---|---|
| | | | Peak 1 | | Peak 2 | | Peak 3 | |
| % EBO62 | % PET | Tg, °C. | °C. | ΔH, J/g | °C. | ΔH, J/g | °C. | ΔH, J/g |
| Virgin 100 Processed | 0 | 84 | 162 | 0.7 | 190 | 1.5 | — | — |
| 100 | 0 | 83 | 163 | 6.0 | 194 | 4.8 | — | — |
| 99.5 | 0.5 | 84 | 166 | 5.9 | 193 | 5.1 | 236 | 0.1 |
| 98 | 2 | 83 | 168 | 5.8 | 195 | 4.4 | 240 | 0.7 |
| 90 | 10 | 84 | 163 | 5.0 | 191 | 3.9 | 241 | 3.2 |
| 70 | 30 | 85 | 162 | 5.2 | 192 | 2.7 | 244 | 9.3 |
| 50 | 50 | 85 | 162 | 4.0 | 192 | 1.5 | 242 | 13.3 |
| 30 | 70 Processed | 86 | 162 | 3.7 | 192 | 0.2 | 246 | 26.8 |
| 0 | 100 Virgin | 87 | 162 | 4.4 | — | — | 245 | 34.2 |
| 0 | 100 | 82 | — | — | — | — | 240 | 55.0 |

Figure 6:
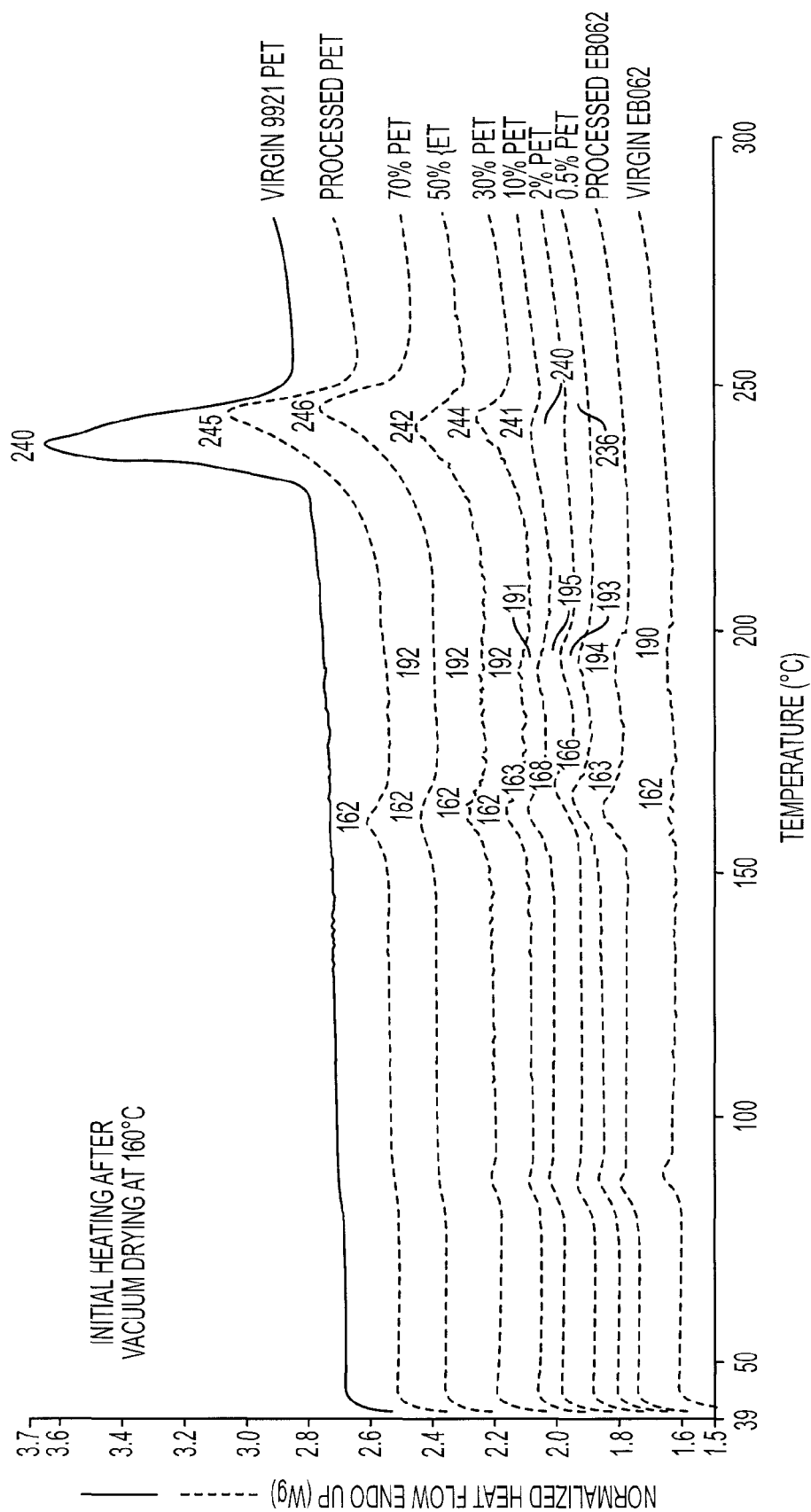
FIGS. 6-8 show DSC scans of various polymer resins.

FIG. 6 gives a normalized overview of the ten DSC scans. It can be seen that processed, 100% PET exhibits a low temperature peak at about 162° C. (that results from the drying temperature) and a higher temperature peak at about 245° C. As the concentration of PET component in each blend decreases, the size of the higher temperature endotherm decreases, however, no significant changes in peak temperatures are observed. In the case of EB062, a small lower temperature peak is observed from 190-195° C., as well as the peak around 162-168. These peaks also show no significant temperature changes as a result of blend composition. The virgin PET sample exhibits a very large melting endotherm. This peak results from the resin's solid state polymerization history, which occurred at temperatures much higher than 160° C. This sample is more highly crystallized than the processed PET or any of the blends. The glass transition temperatures are similar for all materials. These thermal results show that no significant shifting of blend transition temperatures can be observed and indicate that each of the blend components continues to act independently after being processed at the 270° C. extrusion conditions.

Figure 7:
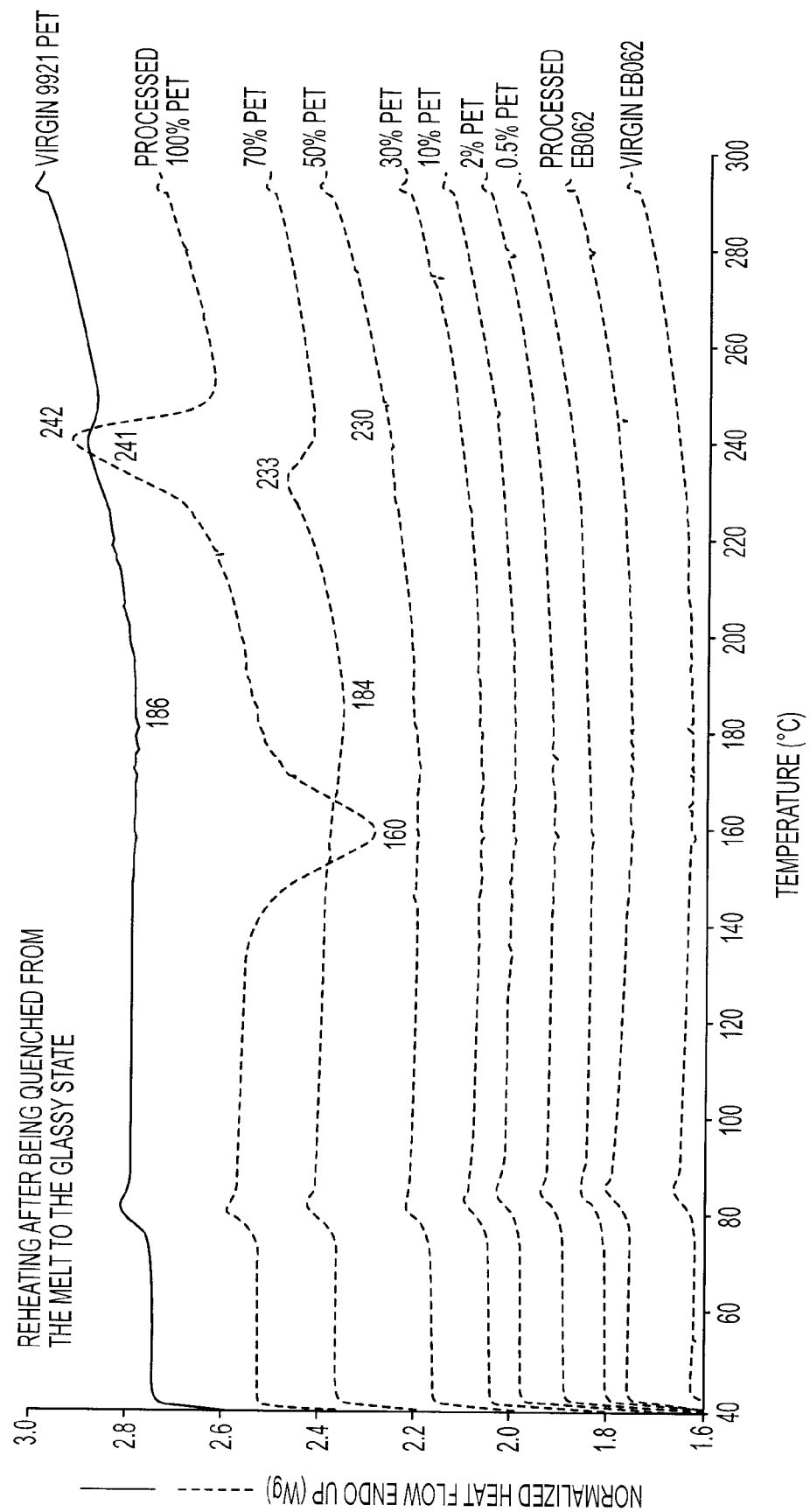

Thermal behavior was also recorded for samples reheated from the quenched amorphous state. An overview of this behavior is shown in the normalized DSC scans of FIG. 7. As can be seen, the amorphous virgin PET has less tendency to crystallize than the processed materials, probably because it is less degraded by extrusion history. The 70% PET blend shows some crystallization and melting behavior, while the blend containing 50% PET shows only a very slight melting endotherm at 230° C. No crystallization or melting behavior is observed for any samples containing less than 50% PET. The glass transition temperatures show very slight decreases as levels of PET are increased.

Figure 8:
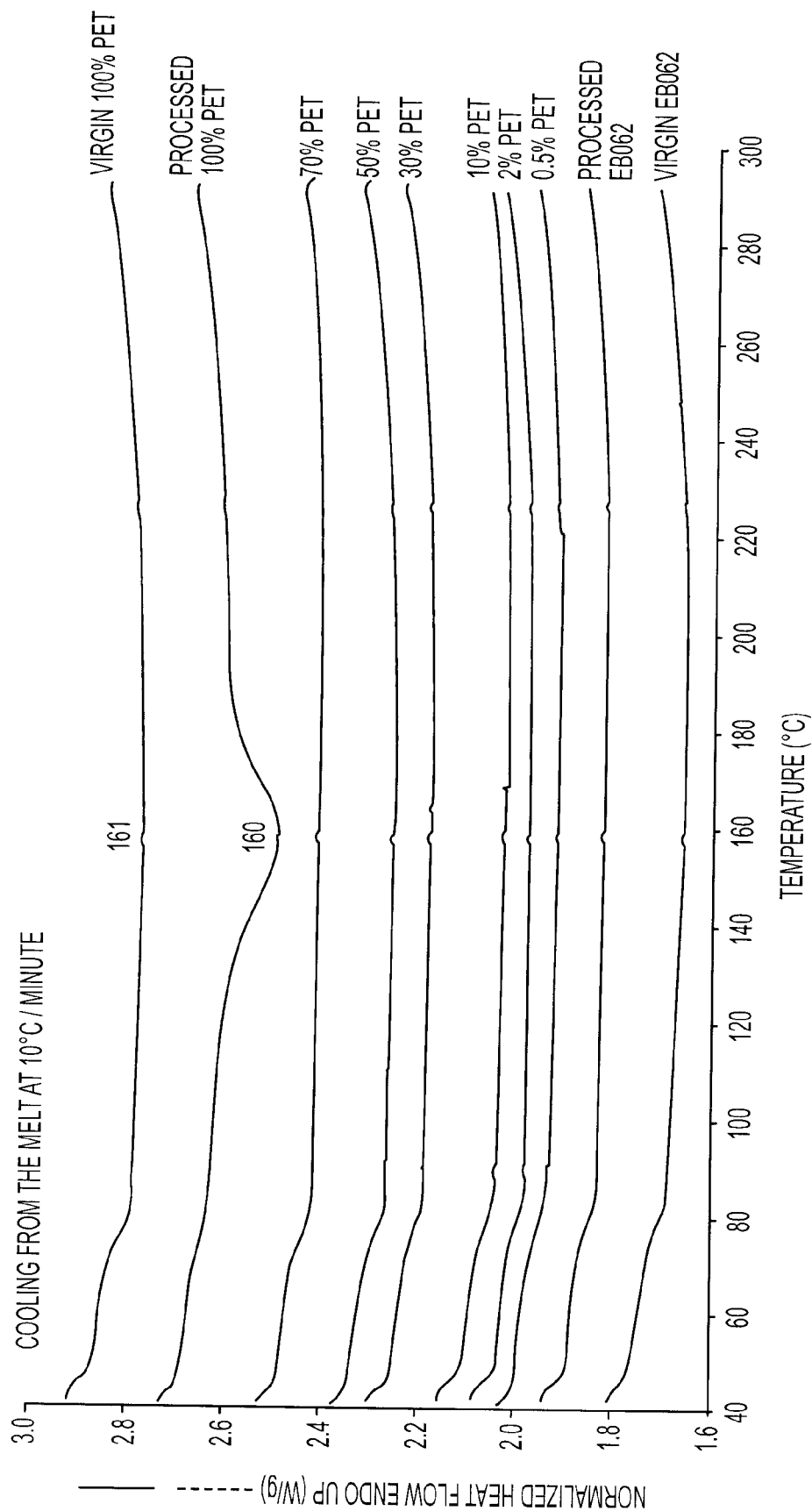

Results obtained for samples cooled from the melt are shown in normalized FIG. 8. As can be seen, only the processed 100% PET shows any significant amount of crystallization while being cooled at 10° C. per minute.

Figure 9:
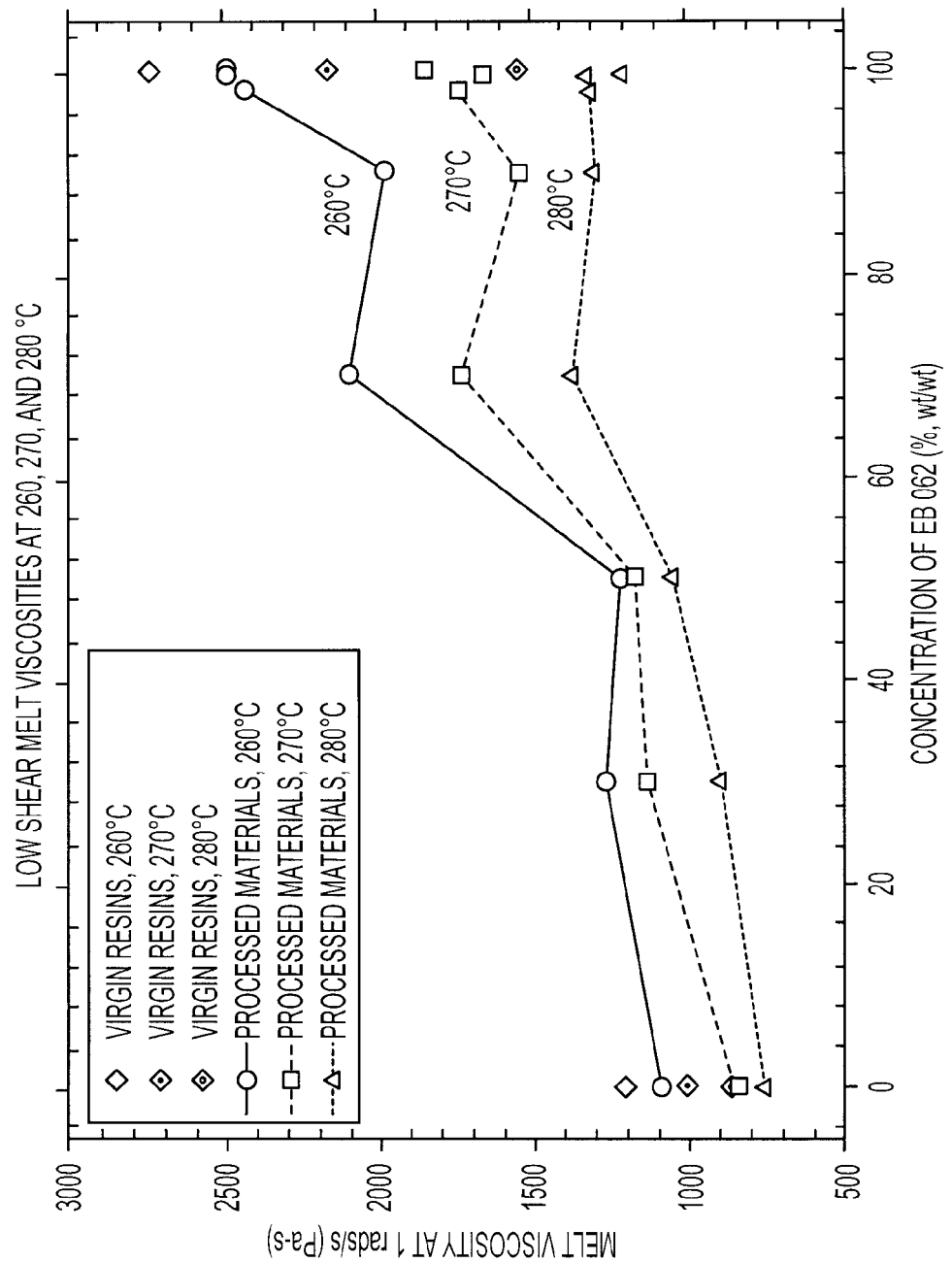
FIGS. 9-10 show melt viscosities of various polymer blend resins as a function temperature.
Figure 10:
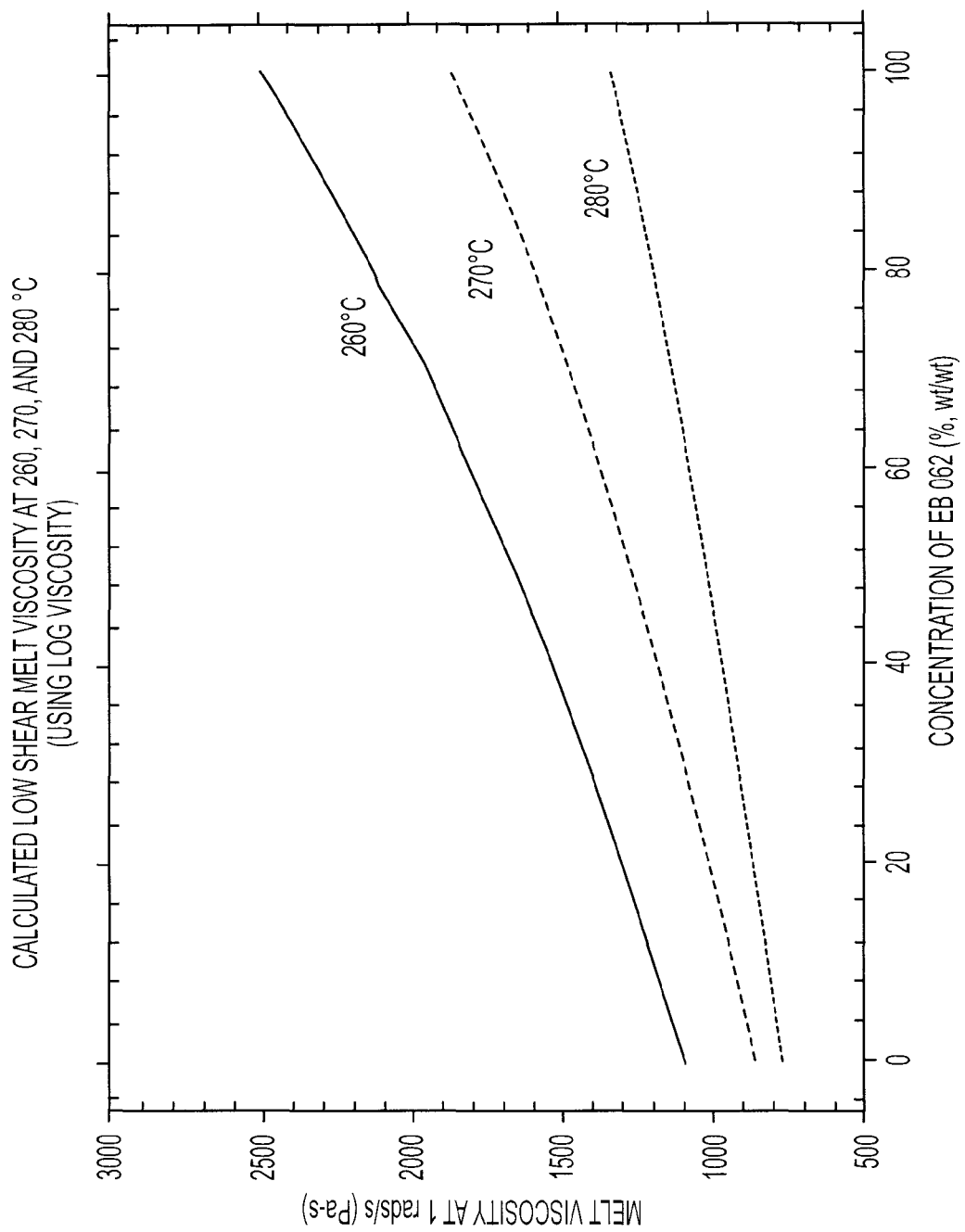
Figure 11:
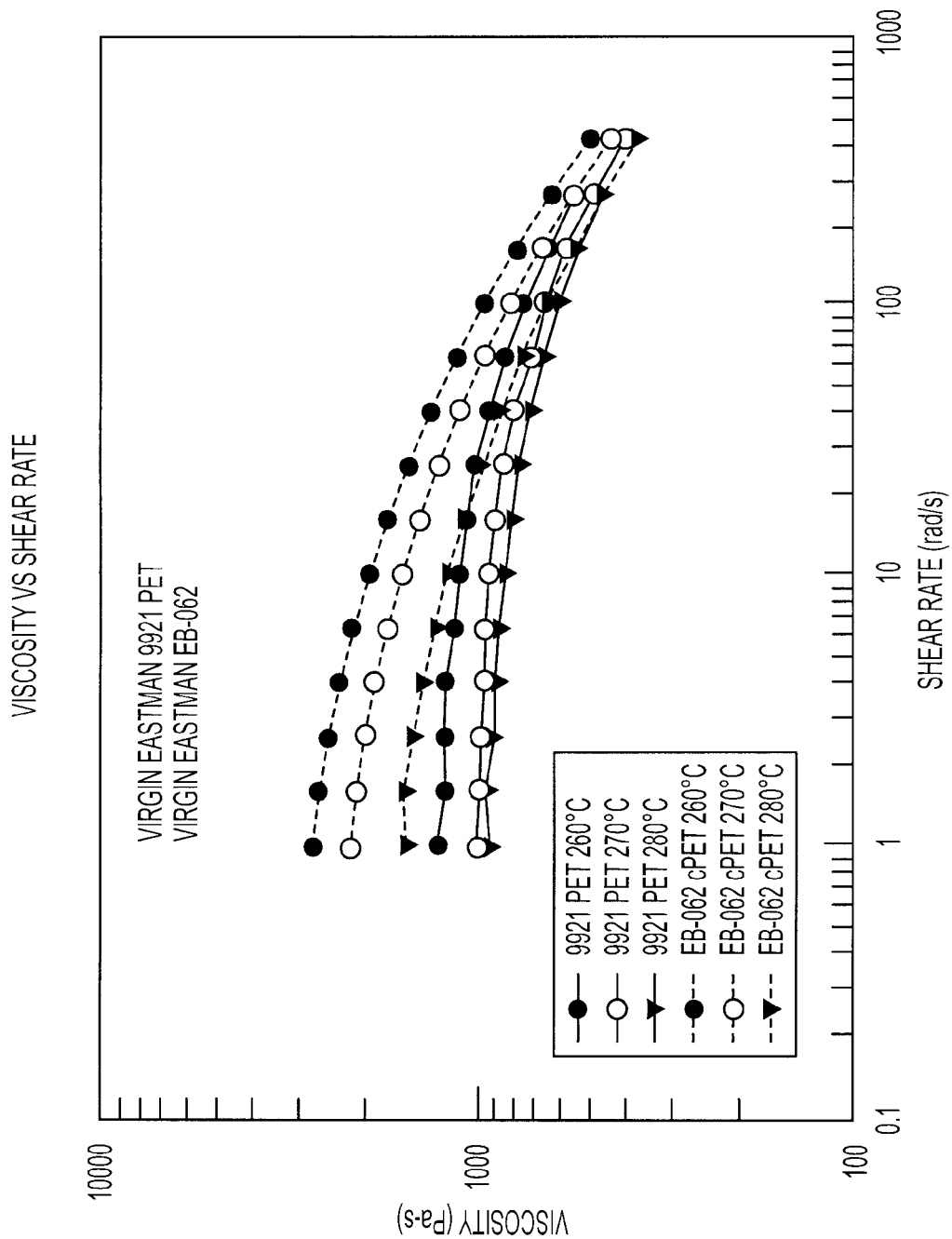
FIGS. 11-18 show melt viscosities of various polymer blend resins as a function of shear rate at various temperatures.
Figure 12:
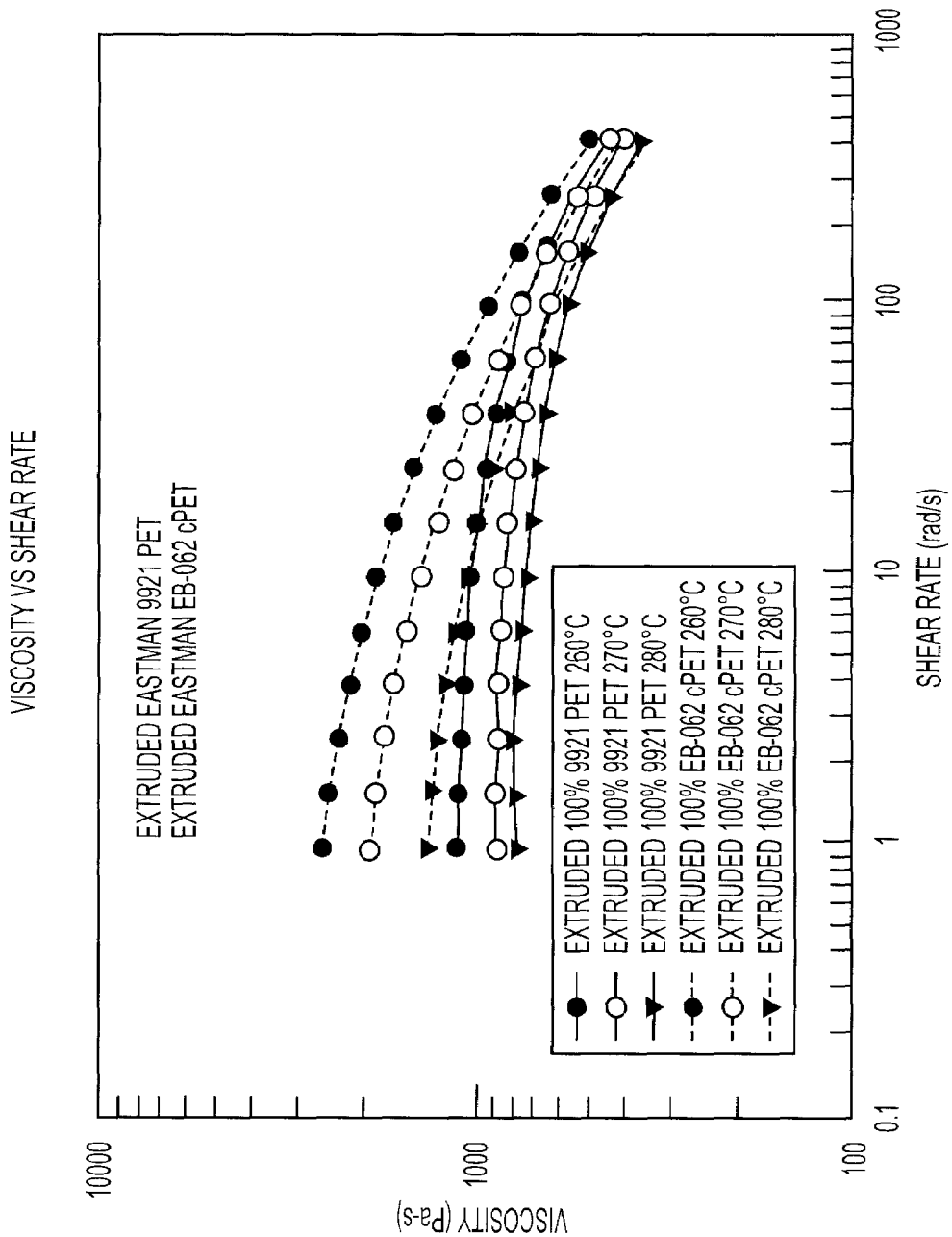
Figure 13:
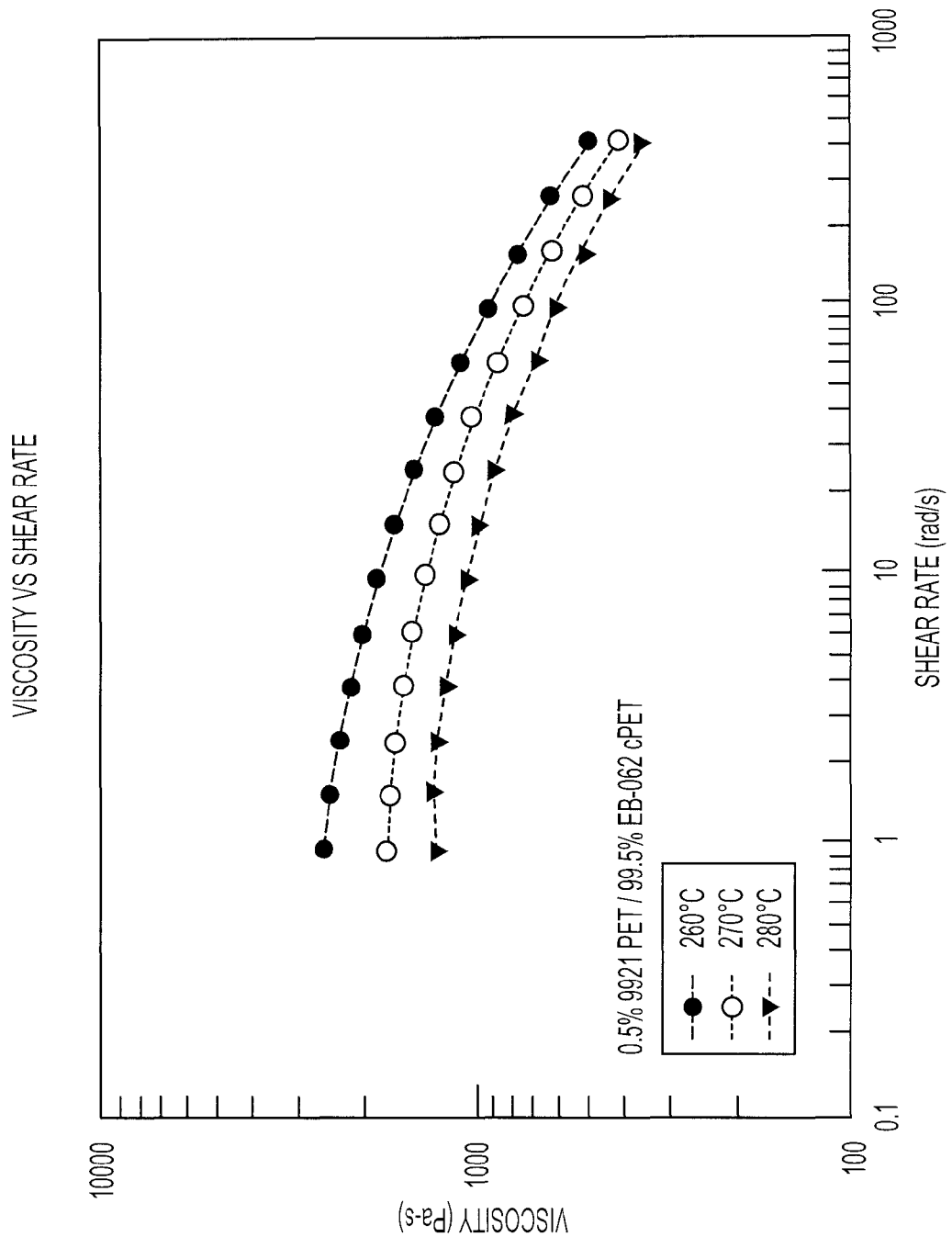
Figure 14:
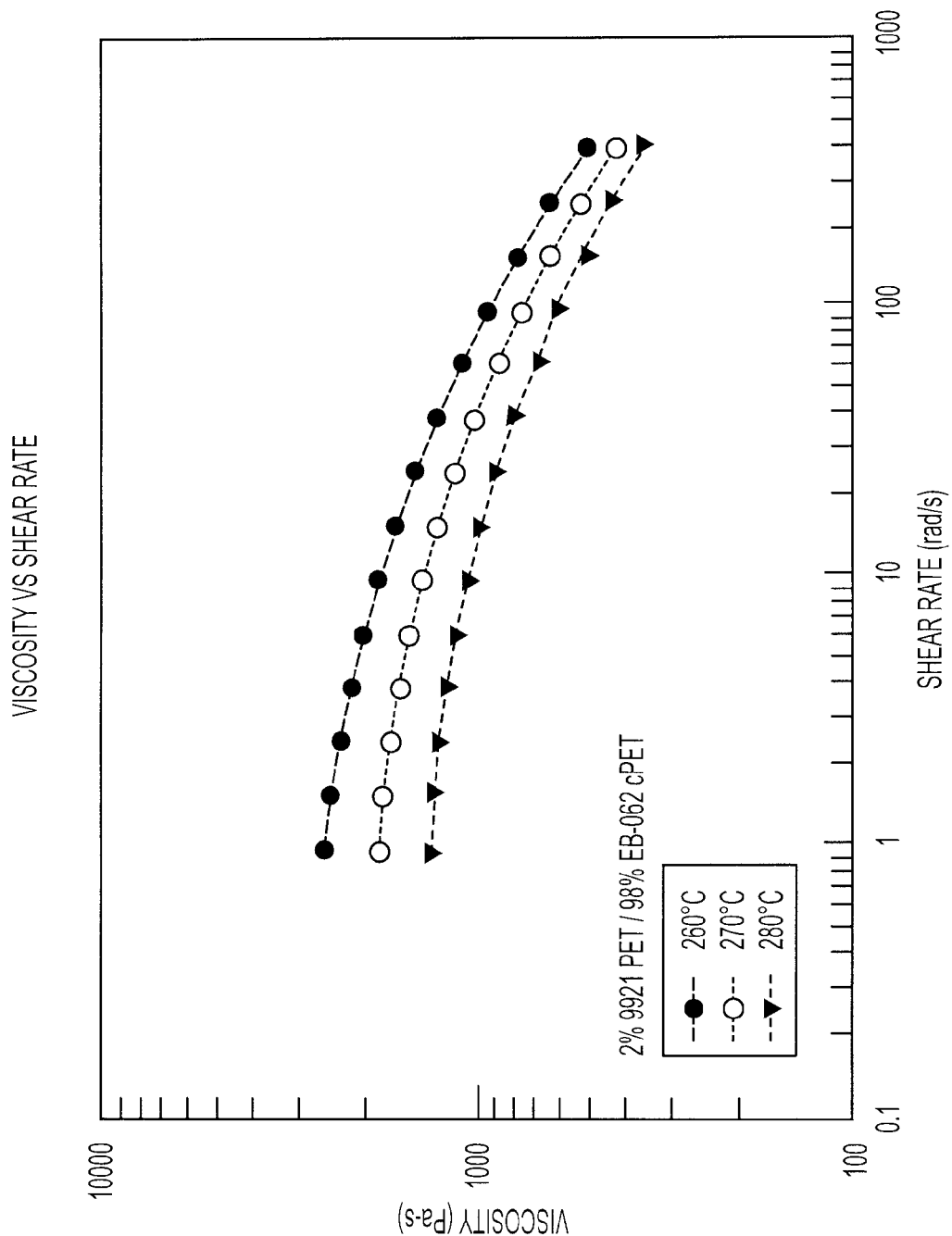
Figure 15:
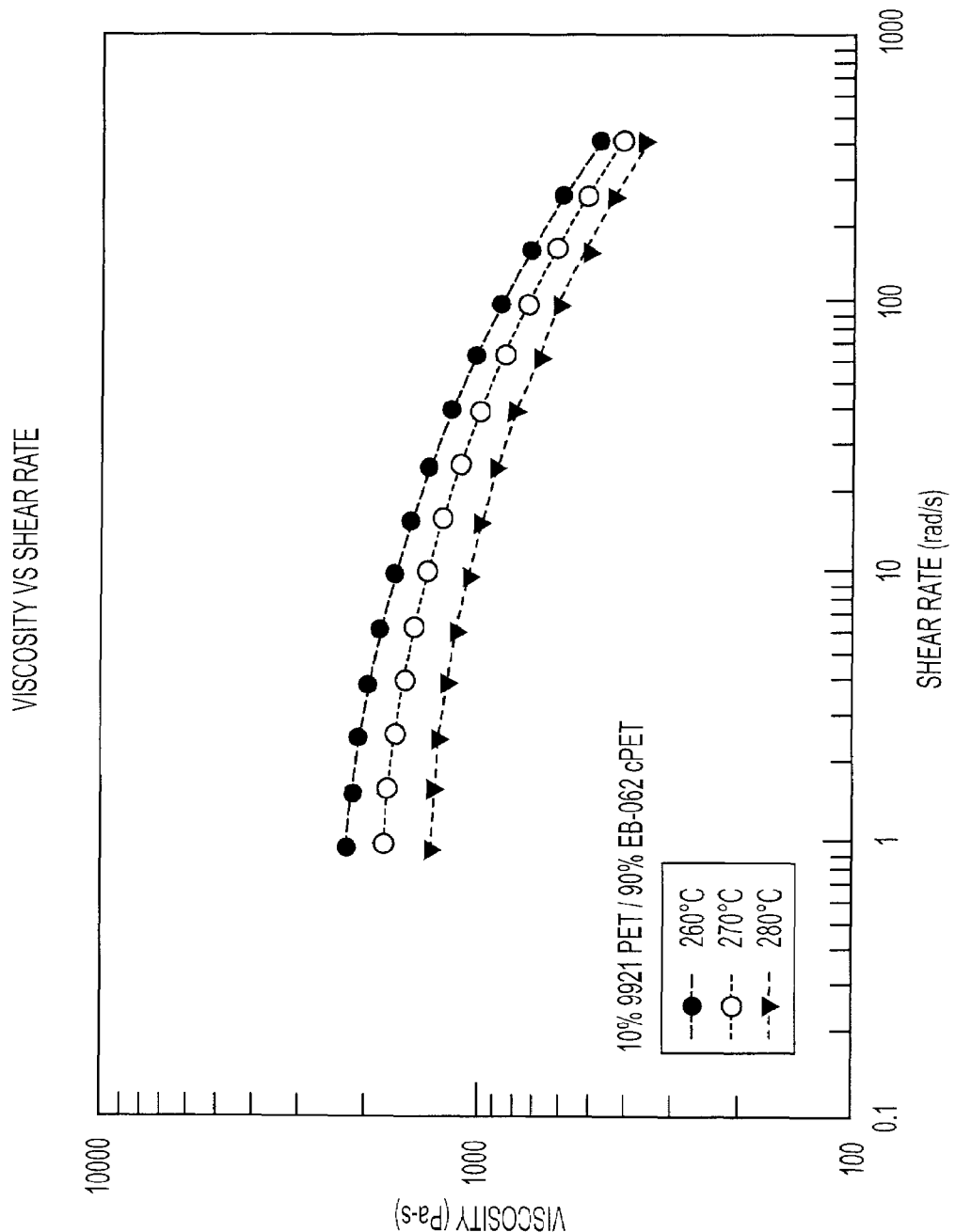
Figure 16:
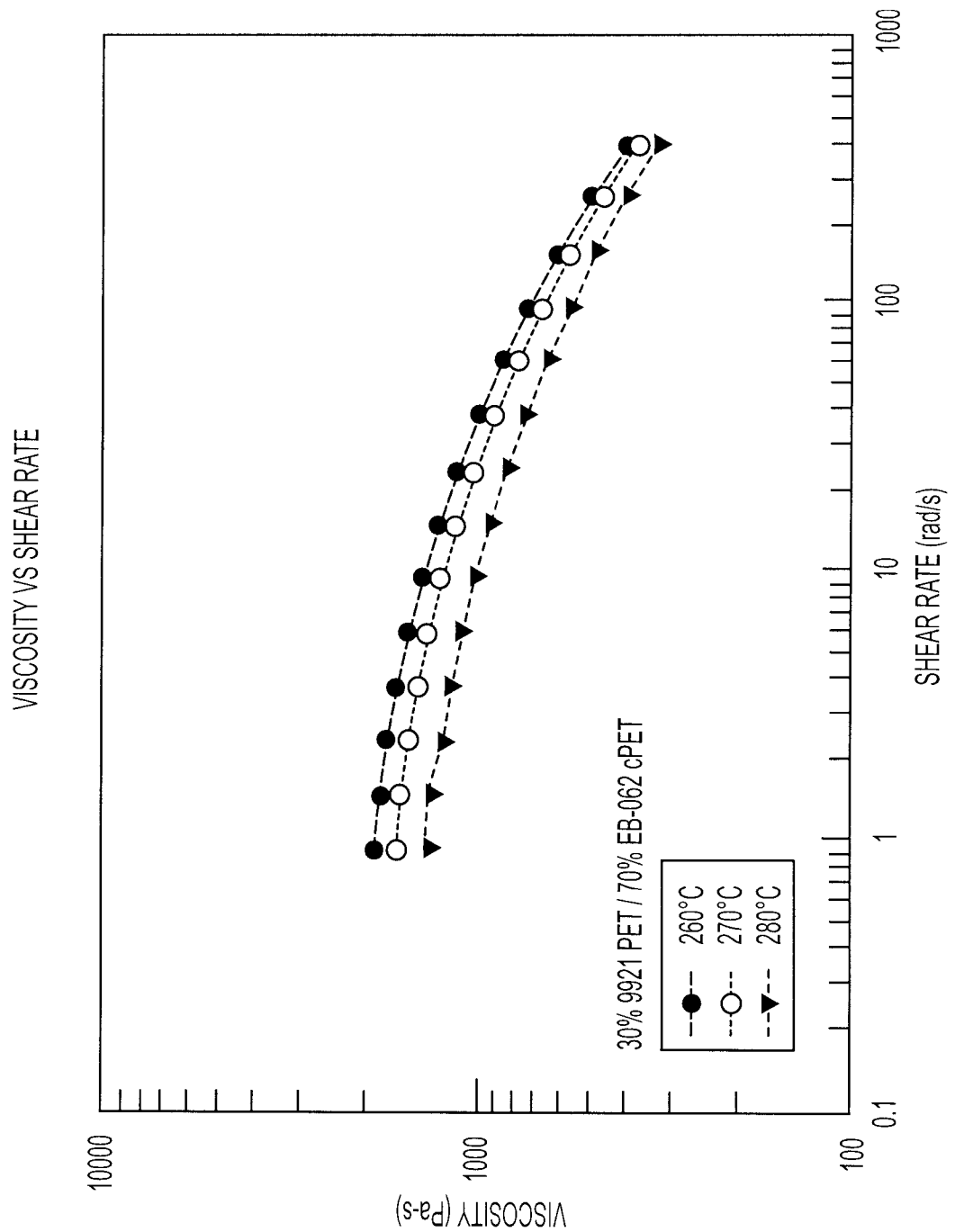
Figure 17:
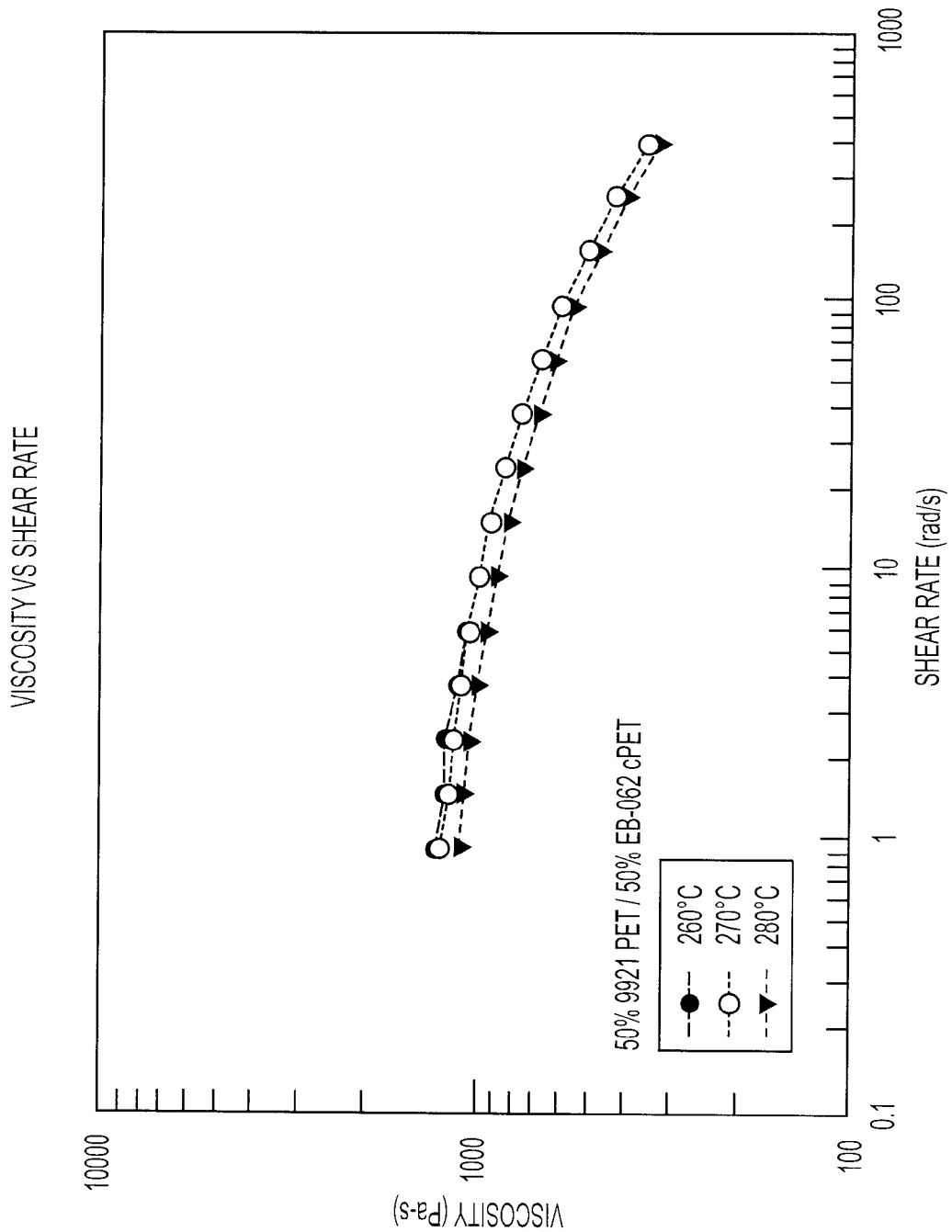
Figure 18:
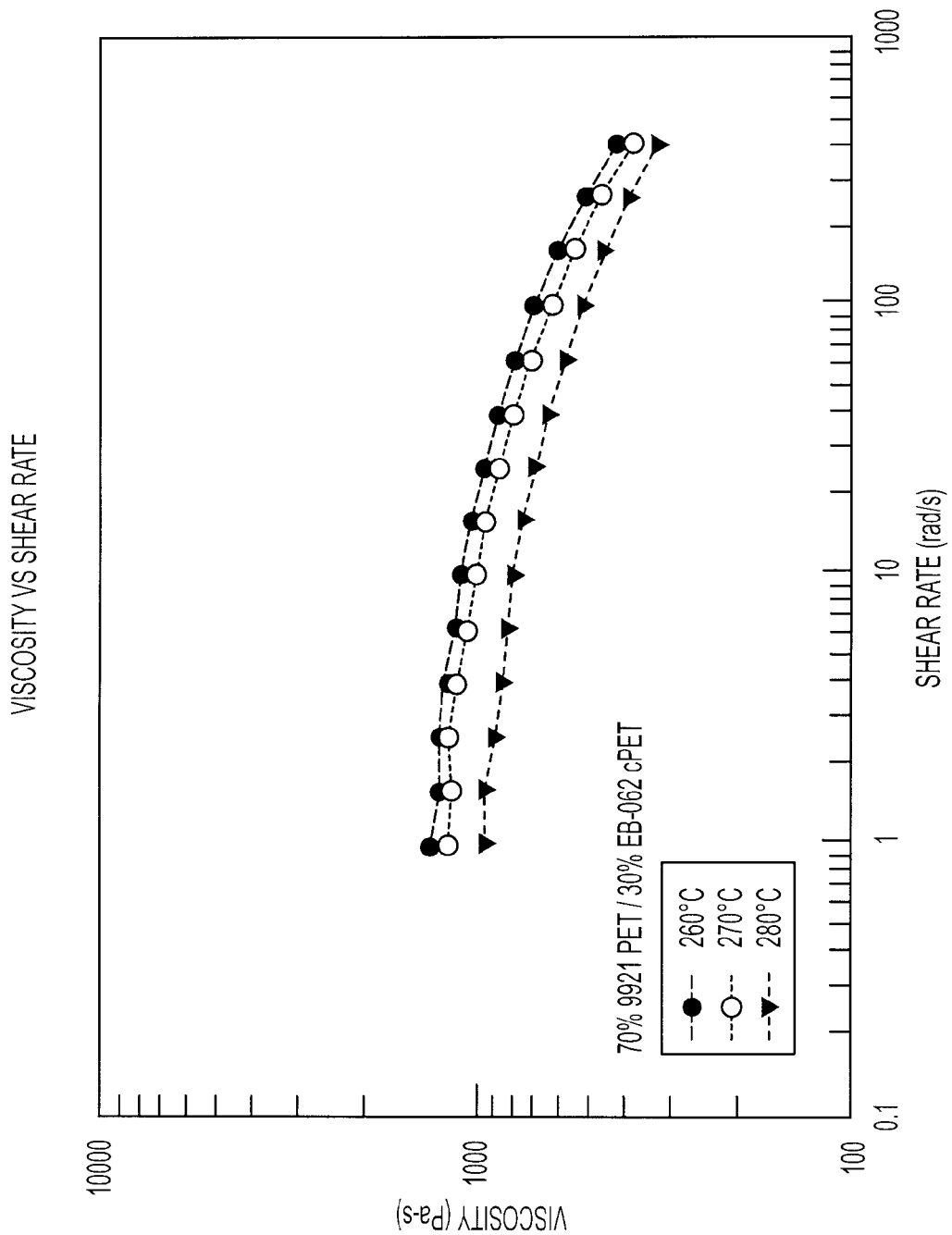

Rheological Evaluations:

Rheological evaluations were performed at 260, 270, and 280° C. These measurement temperatures were chosen in order to compare all blends at the same conditions. Thermal results, obtained after samples had been held at 160° C. overnight, indicate that portions of the PET component of most blends would be in the crystalline state after extended exposure to typical drying temperatures. Temperatures lower than 260° C., thus would not be appropriate for monitoring rheology of samples containing significant amounts of PET. All samples were vacuum dried overnight at 115° C. to attain moisture concentrations of less than 100 ppm before rheological evaluations. The table lists melt viscosity values obtained at 1 rad/sec and at 100 rad/sec at the three measurement temperatures. FIG. 9 shows melt viscosities measured at 1 rad/sec in relationship to concentration of EB062 in PET. Values are given at 260, 270 and 280° C. FIG. 10 gives calculated values assuming additive relationships between the two components. Values of processed EB062 and 9921 PET were used for these calculations. FIGS. 10-18 show all of the measured rheological data plotted as functions of shear rate for each material at each temperature as indicated.

Shear Rate-Temperature Superposition

The technique of Shear Rate-Temperature superposition (STS) was used on the viscosity versus shear rate data in order to predict viscosities outside the range of measurement. For example, the STS technique was successfully used to predict the viscosity at 210° C. for PET which would normally be solid at that temperature.

Shear Rate-Temperature superposition states that increasing temperature is equivalent to increasing the shear rate. For this work, a 270° C. reference temperature is chosen and flow curves at 260° C. and 280° C. are shifted horizontally along the shear rate axis until they merge with the 270° C. data. The new curve is the master curve and is modeled by the Cross Equation, $$\eta^* = \frac{c1}{(1 + (c2 \times X)^{(1-c3)})}.$$

The amount of shift of shear rate, $A_T$, is proportional to the temperature and is modeled by the Arrhenius equation $$A_t = e^{\frac{Ea}{R}\left(\frac{1}{T_1} - \frac{1}{T_o}\right)}.$$

Figure 19:
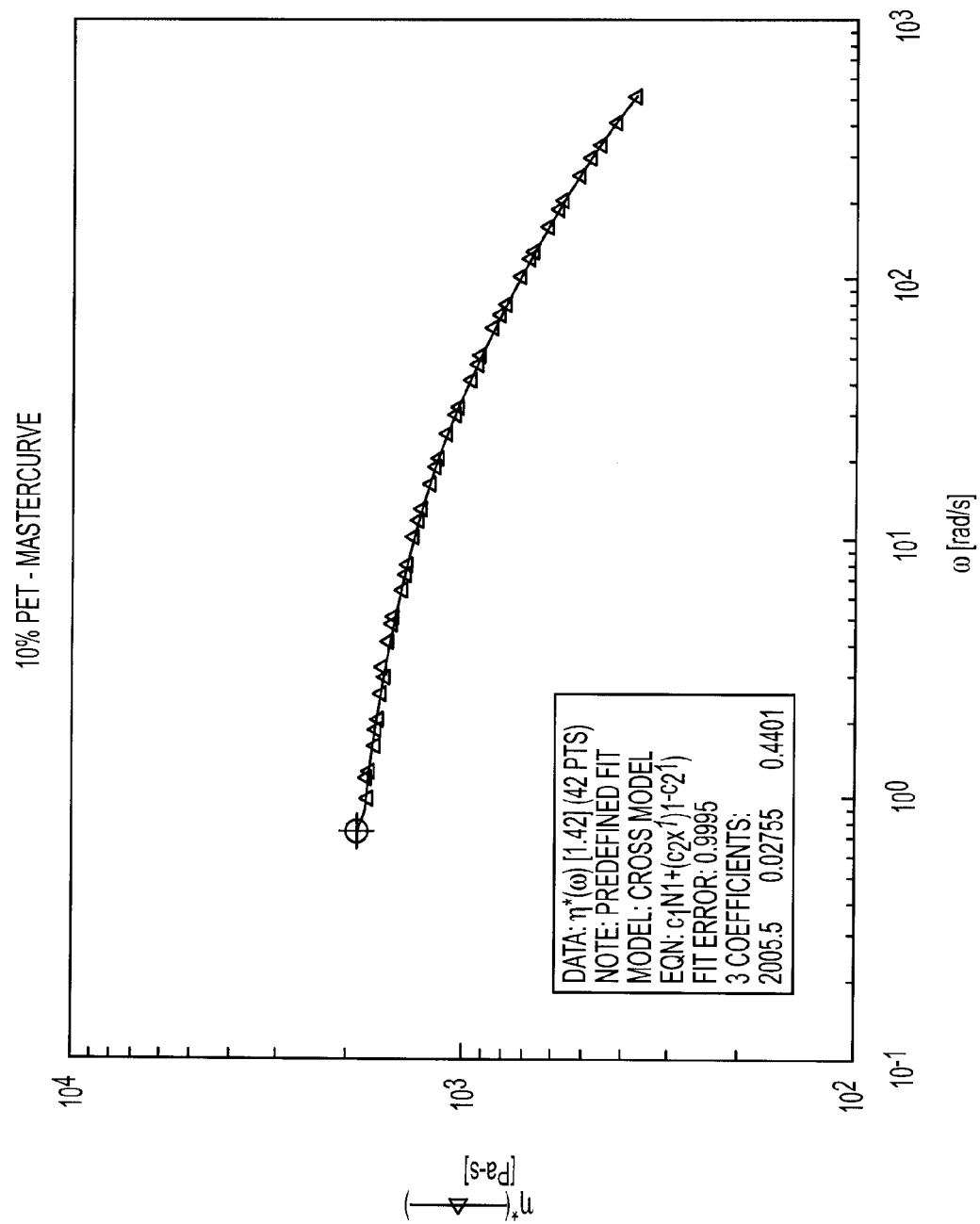
FIG. 19 shows a master curve of PET at various temperatures.

FIG. 19 shows a typical master curve and the mathematical model used. The viscosities decrease as the percent PET increases, in-line with the actual data values.

EXAMPLE 2

This example illustrates thermal evaluations of extrusion blow molding bottles. Bottles containing various levels of extrusion grade PET (EB062) and Eastman 9921 PET were evaluated in terms of their thermal properties as well as their behaviors under oven temperatures of 110, 150, and 200° C. (230, 302, and 392° F.).

Materials

Bottle samples containing 15, 30, 50, and 75% PET. Extrusion grade EB062 Eastman PET supplies the remaining resin composition.

Oven Exposure

Samples were prepared for treatment in the following manner:
 1. Bottle walls, from samples containing: 75%, 50%, 30%, and 15% PET as well as commercial 2 liter sidewall, were cut into small pieces.
 2. Cut samples were exposed to the following conditions in a vacuum oven:
    a. 3 hr at 110° C. in Aluminum pans
    b. 3 hr at 150° C. in Aluminum pans
    c. 1.25 hrs at 200° C. in glass vials
    d. 4 hrs at 200° C. in glass vials
 3. heat treated samples were checked for sticking and examined visually after each step.
 4. Samples were photographed to document sticking and color changes.

Thermal Properties

A Perkin-Elmer DSC-7 was used to monitor thermal properties of all resin and blend samples at heating and cooling rates of 10° C. per minute. A nitrogen purge was utilized to prevent oxidative degradation.

Results and Discussion:

Oven Exposure

Figure 20:
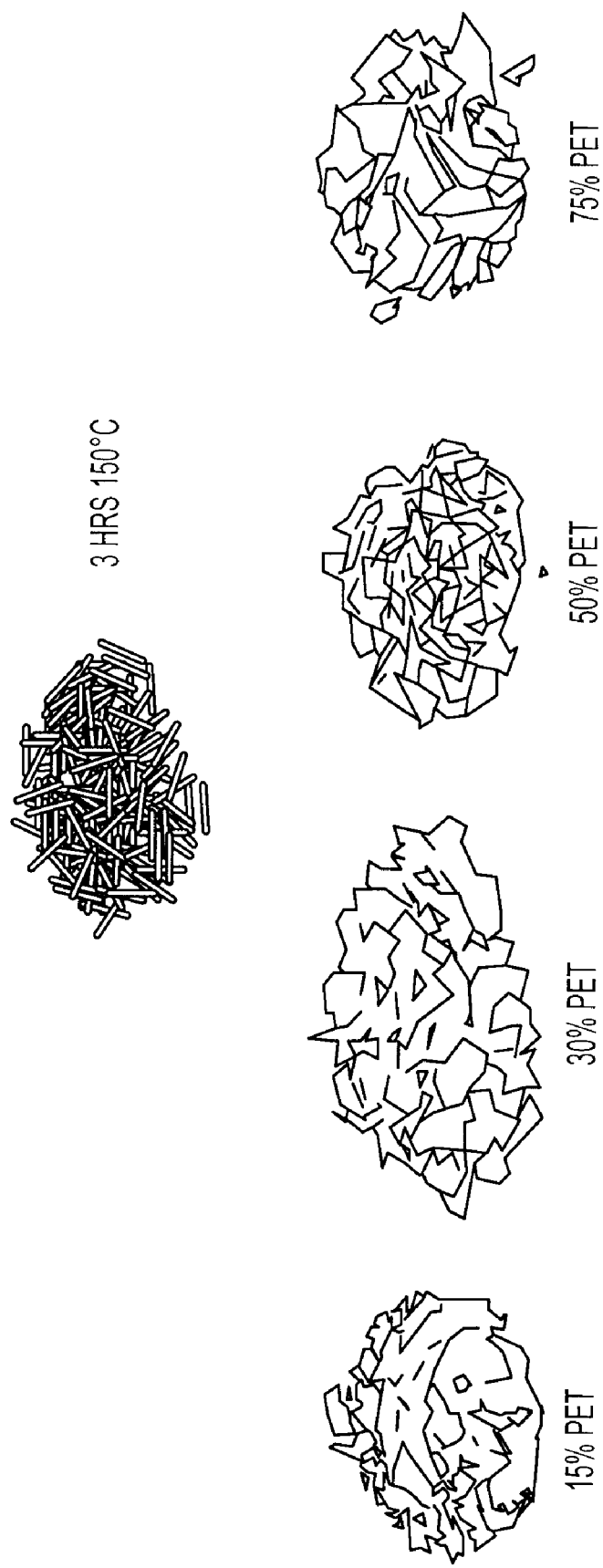
FIGS. 20-24 show effect of temperature on various polymer blend samples.

Bottle walls, from samples containing: 75%, 50%, 30%, and 15% PET as well as commercial 2 liter sidewall, were cut into small pieces and then exposed for three hours to 110° C. in aluminum pans. They were then removed and examined in terms of appearance and sticking characteristics. The sample containing 15% PET remained clear and was slightly stuck together. Materials containing 30% PET were slightly cloudy and slightly stuck together. Samples containing 50% PET behaved and appeared like those with 30% PET. Samples containing 75% PET were slightly less stuck together, slightly curled, and slightly more cloudy than the other materials. These samples were again placed in aluminum pans and then held at 150° C. for three hours. In each case they were slightly more stuck together than they had been at the previous 110° C. condition. These samples were photographed and showed the relative differences in appearance exhibited in FIG. 20.

Figure 21:
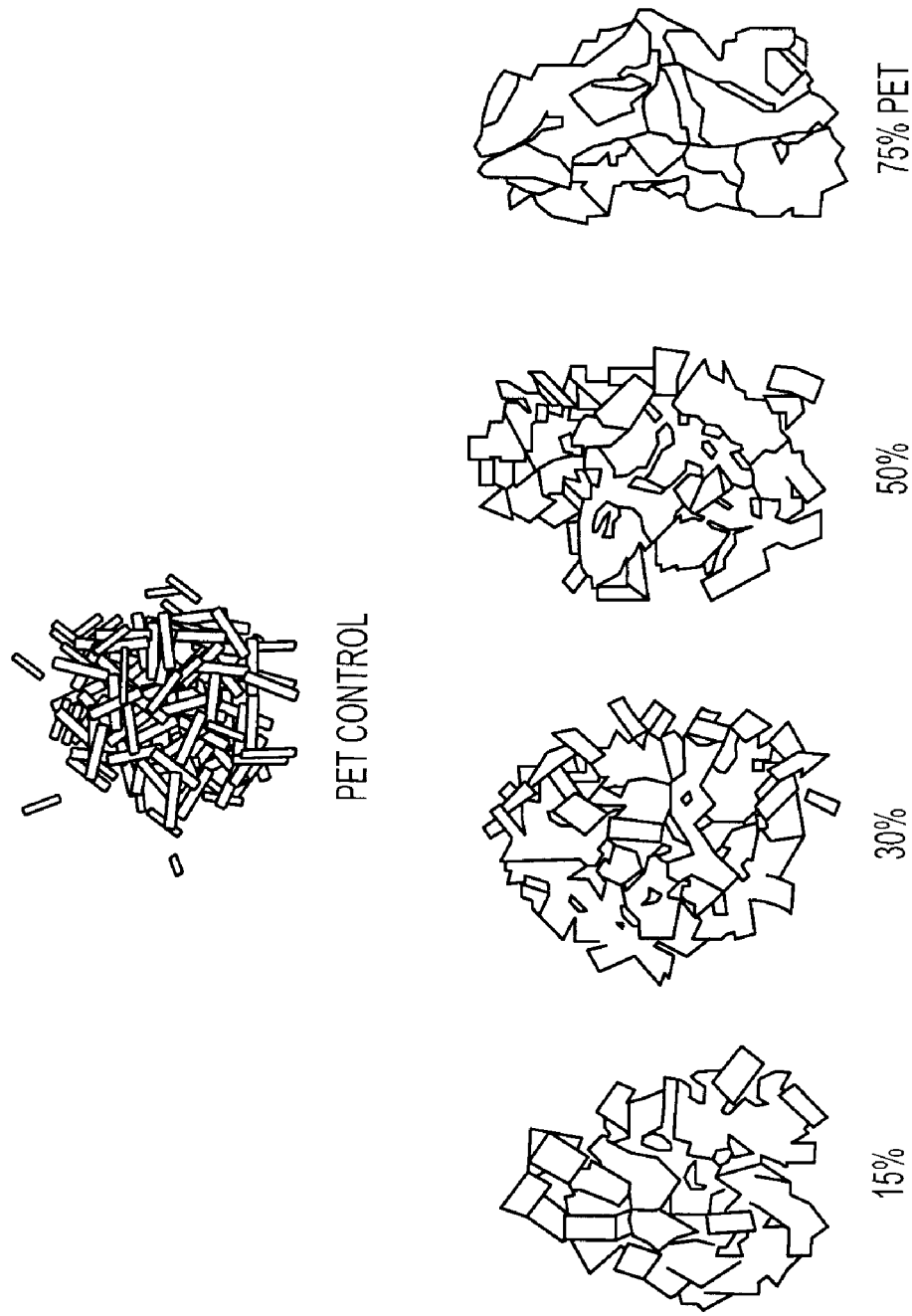
Figure 22:
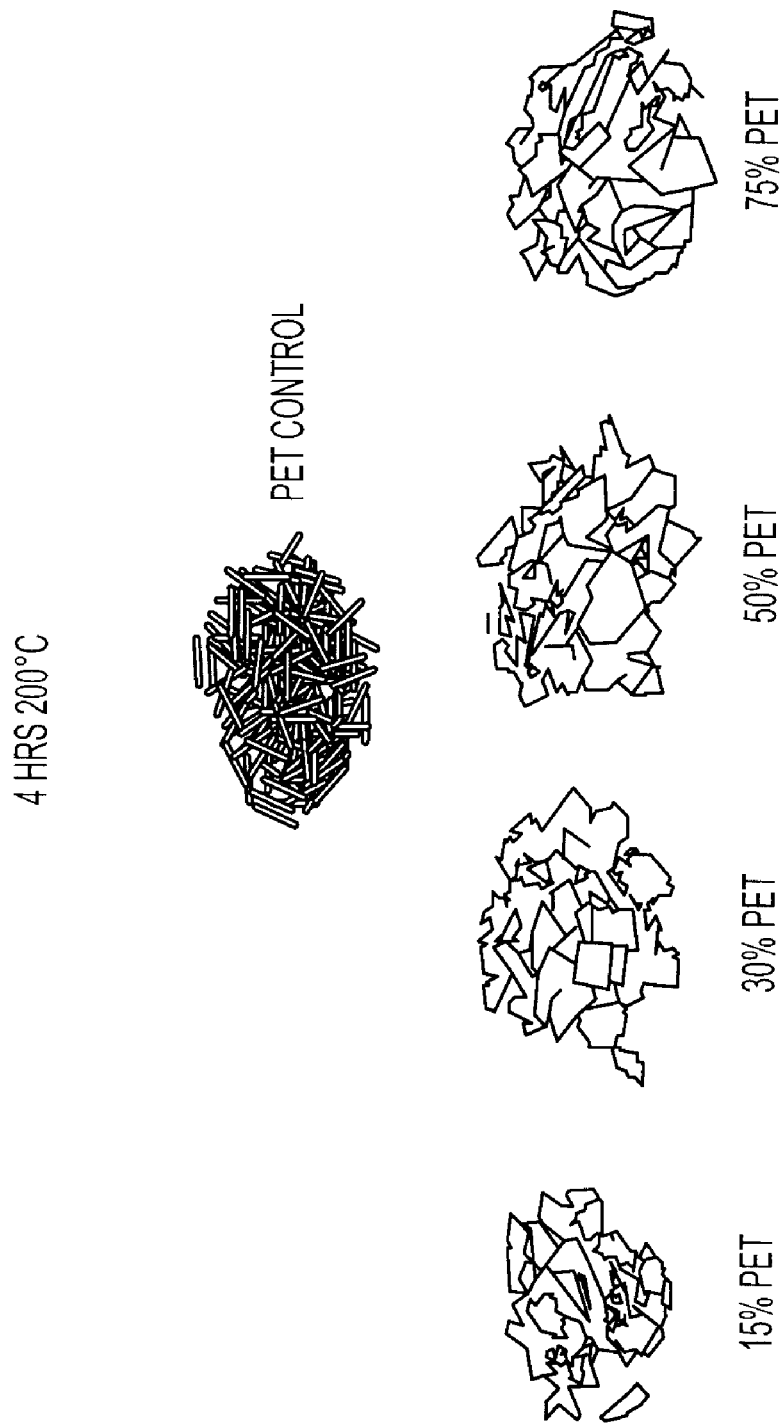
Figure 23:
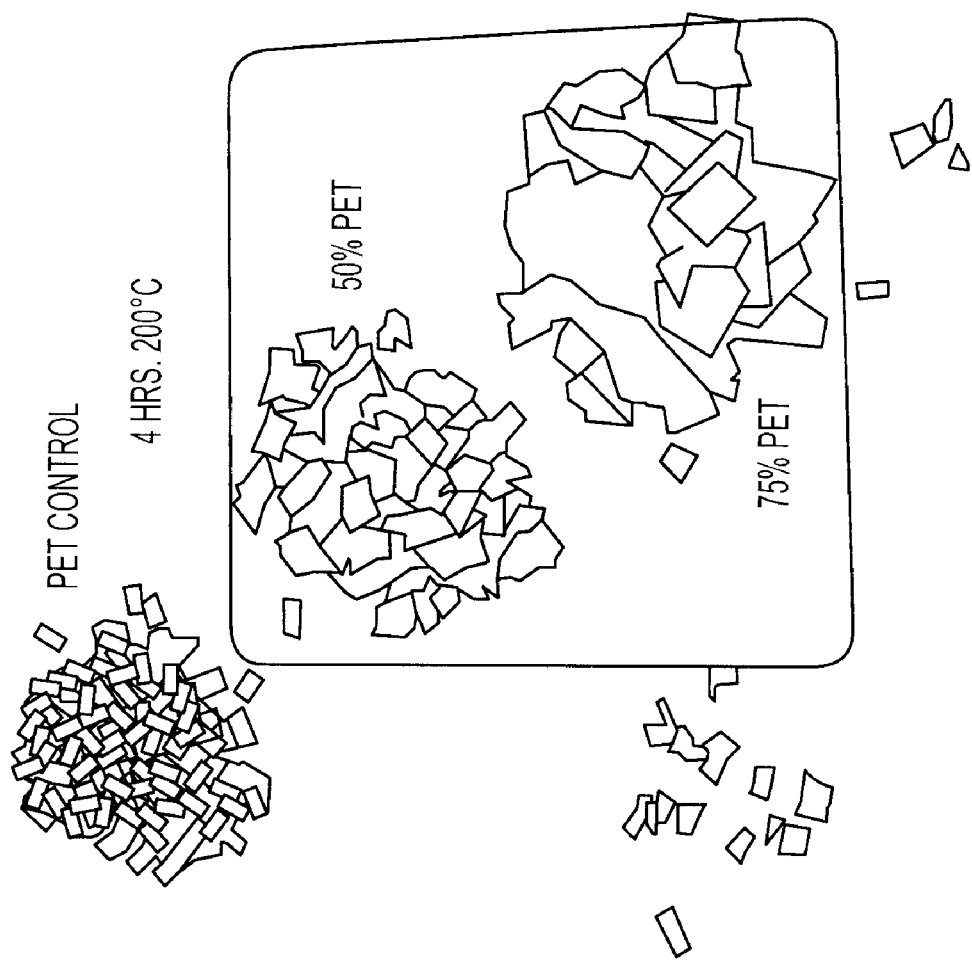
Figure 24:
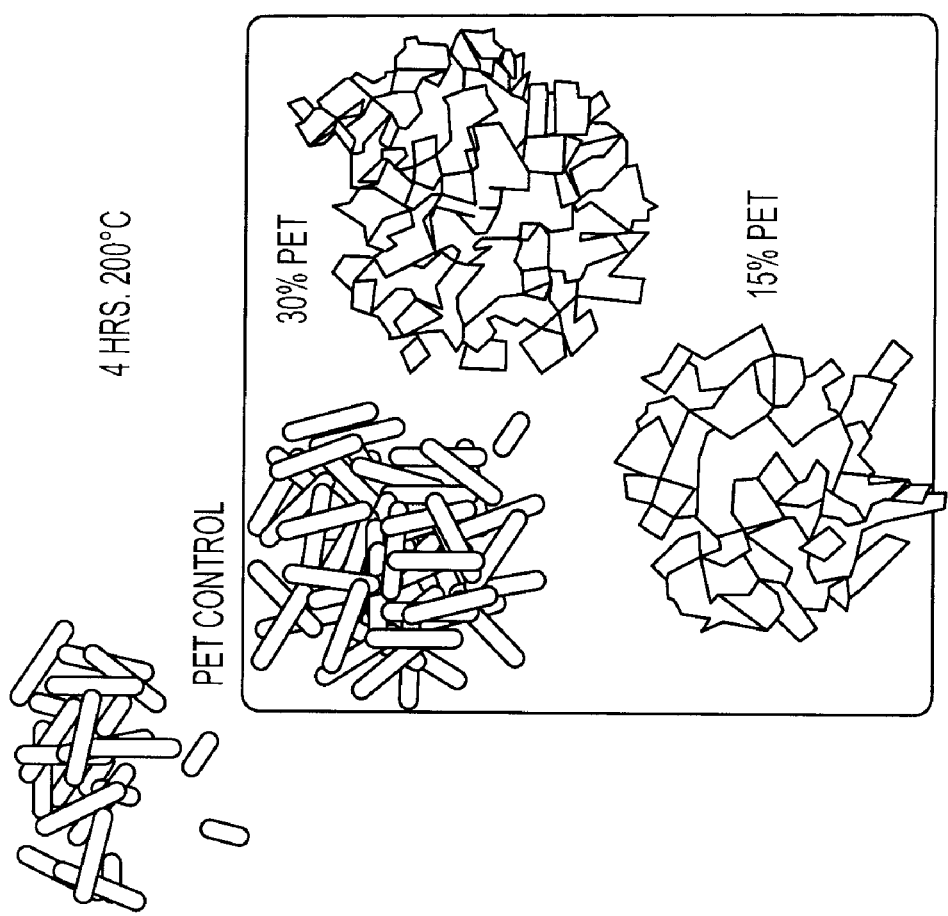

The samples were then put into glass vials and placed in an oven at 200° C. for 1.25 hrs. After this exposure they were removed from the vials, broken apart, and photographed to give the appearances exhibited in FIG. 21. These samples remained relatively white in appearance. The samples were then placed in the glass vials again and held at 200° C. for an additional four hours. As shown in FIGS. 22-24, samples containing lower levels of PET showed more brownish colors. The sample containing only 15% PET showed the most color change and the pieces appeared to be the most stuck together. The commercial, 2-liter bottle sidewall PET sample pieces remained clear and exhibited no sticking characteristics throughout all exposure conditions.

Thermal Evaluations

Figure 25:
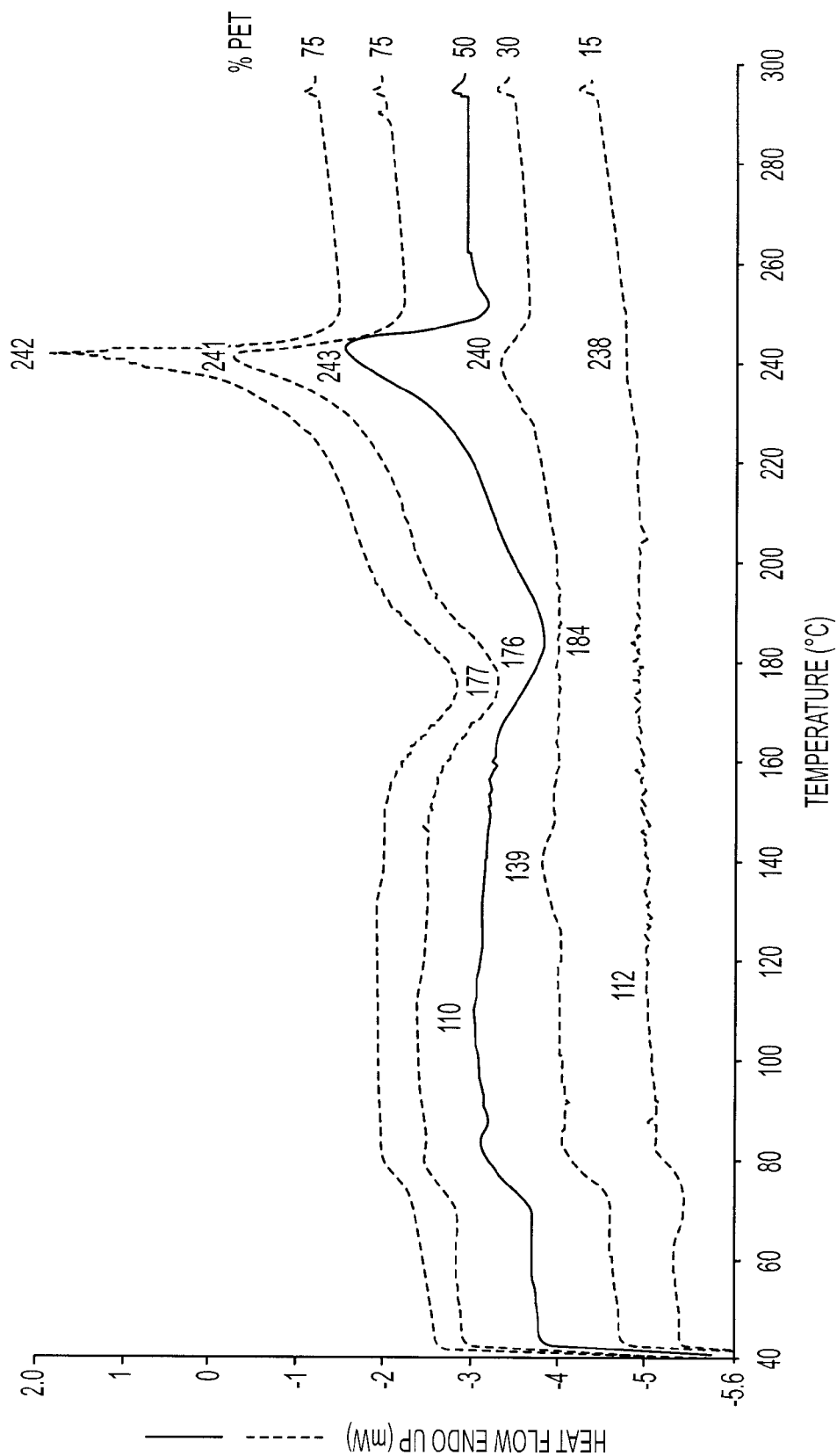
FIGS. 25-27 show DSC scans of polymer blend resin samples from thermal experiments.

Sections of each bottle wall were heated at 10° C. per minute in the DSC in order to record the thermal transitions resulting from sample composition and processing conditions. Table 3 lists glass transition temperatures (Tg), crystallization exotherm peak temperatures and heats of crystallization (ΔH), as well as peak endotherm temperatures and heats of fusion for all materials at the compositions indicated. FIG. 25 gives a normalized overview of the five DSC scans described in Table 3. If heats of crystallization are subtracted from heats of fusion given on Table 3, approximate values for initial crystallinity can be obtained. Values obtained in this manner (with 129 J/g taken as 100% crystalline PET) are not more than 4%, if the entire sample weight is used to obtain ΔH. If these samples were 100% PET, they would be considered to be substantially amorphous in nature.

CESA Extend from Clariant. The extruder and die temperatures were set at 500° F. (260° C.). A 64 oz handleware blow mold tool was used to make monolayer containers. Regrind generated was dried and reused at 40% mixed into the main layer. Containers produced were translucent with good wall uniformity. Bottle sidewall haze for wall thickness of 20 mil (0.51 mm) was measured at <14 versus the control EB062 with a haze value of 4.1. A similar container made from clarified propylene had a haze of 18.2. Plaques made from ground container measuring 3 mm in thickness had a haze value of <3.5.

Figure 28:
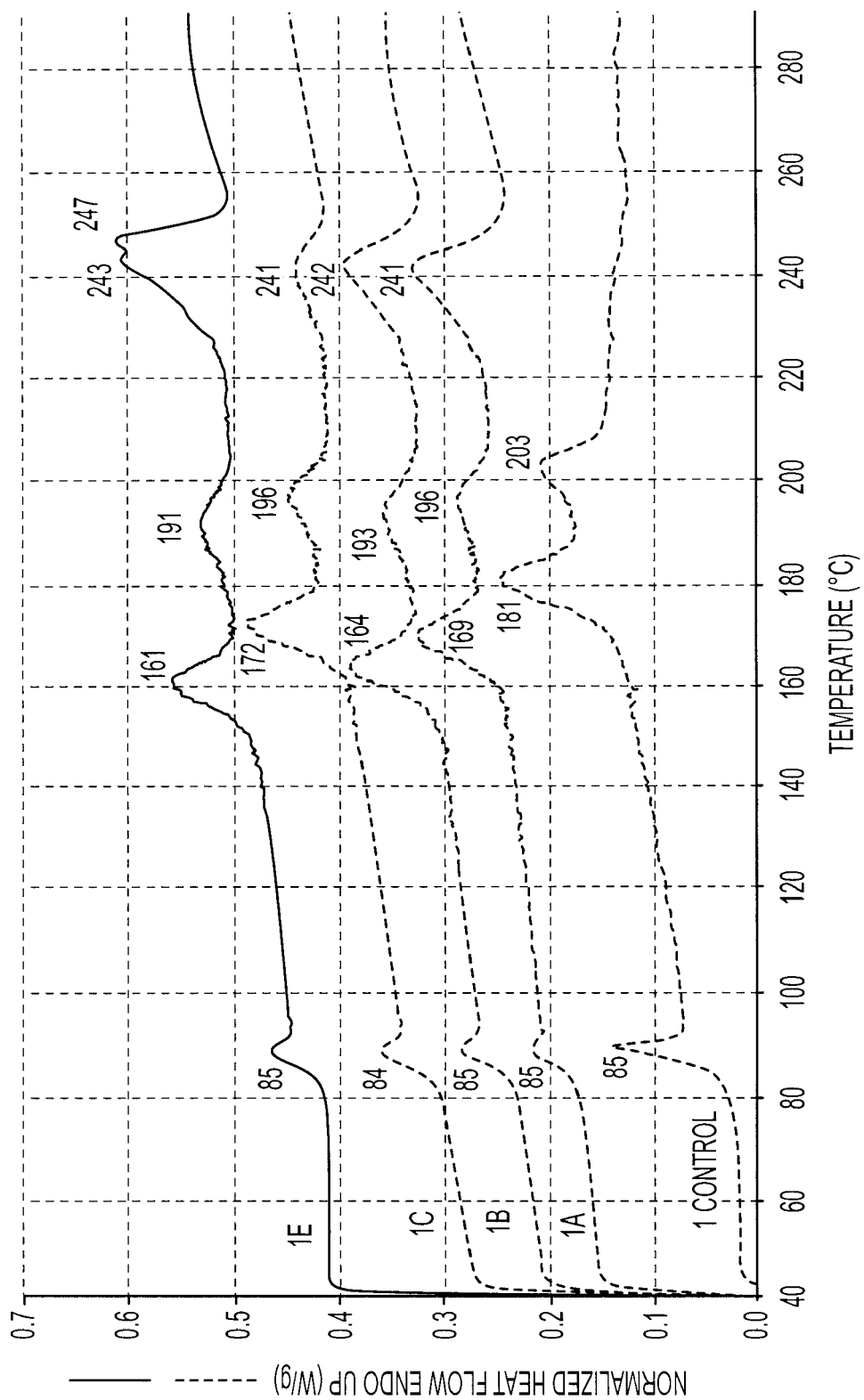
FIG. 28 shows initial thermal transitions, recorded for sections of vacuum dried (1 Control, 1A, 1B, 1C, and 1E) bottle wall materials, heated at 10° C. per minute in a DSC.
Figure 29:
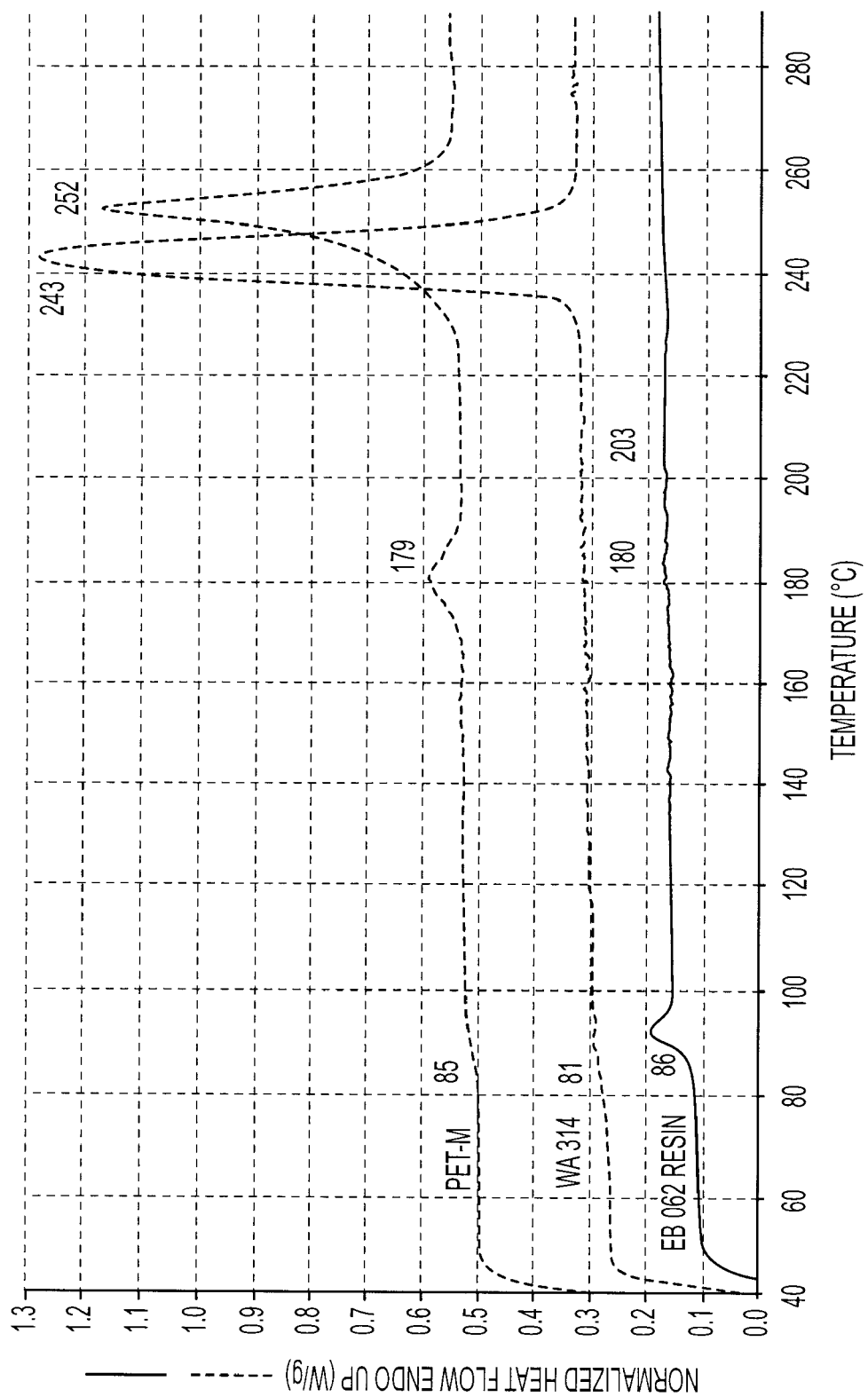
FIG. 29 shows initial thermal transitions, recorded for vacuum dried (EB062, WA 314, and PET-M) resins, heated at 10° C. per minute in a DSC.

Containers were analyzed by differential scanning calorimetry (DSC), as summarized in Table 4 below. Container wall sections were analyzed after drying overnight at 160° C. under vacuum. While WA314 by itself under the conditions described had a melting peak of 243° C. and a melting enthalpy of 60 J/g, the monolayer container with regrind had a melting peak of 242° C. with a melting enthalpy of 7 J/g. EB062 dried under similar conditions showed no significant melting characteristics (FIGS. 28 and 29). This demonstrates the ability of the monolayer construction to have suitable crystallinity to address recyclability requirements.

TABLE 3

| % EB062 | % PET | Tg, °C. | Crystallization Exotherm Peak Temp, °C. | −ΔH, J/g | Melting Endotherm 1 Peak Temp, °C. | ΔH, J/g | Melting Endotherm 2 Peak Temp, °C. | ΔH, J/g |
|---|---|---|---|---|---|---|---|---|
| 85 | 15 | 78 | — | — | 112 | (0.2) | 238 | (0.2) |
| 70 | 30 | 77 | — | — | 139 | (1.5) | 240 | (4.2) |
| 50 | 50 | 75 | 84 | (11.0) | 110 | (0.8) | 243 | (15.0) |
| 25 | 75 | 76 | 138, 177 | (25.0) | — | — | 242 | (27.5) |
| 25 | 75 | 75 | 131, 176 | (24.7) | — | — | 241 | (25.6) |

Figure 26:
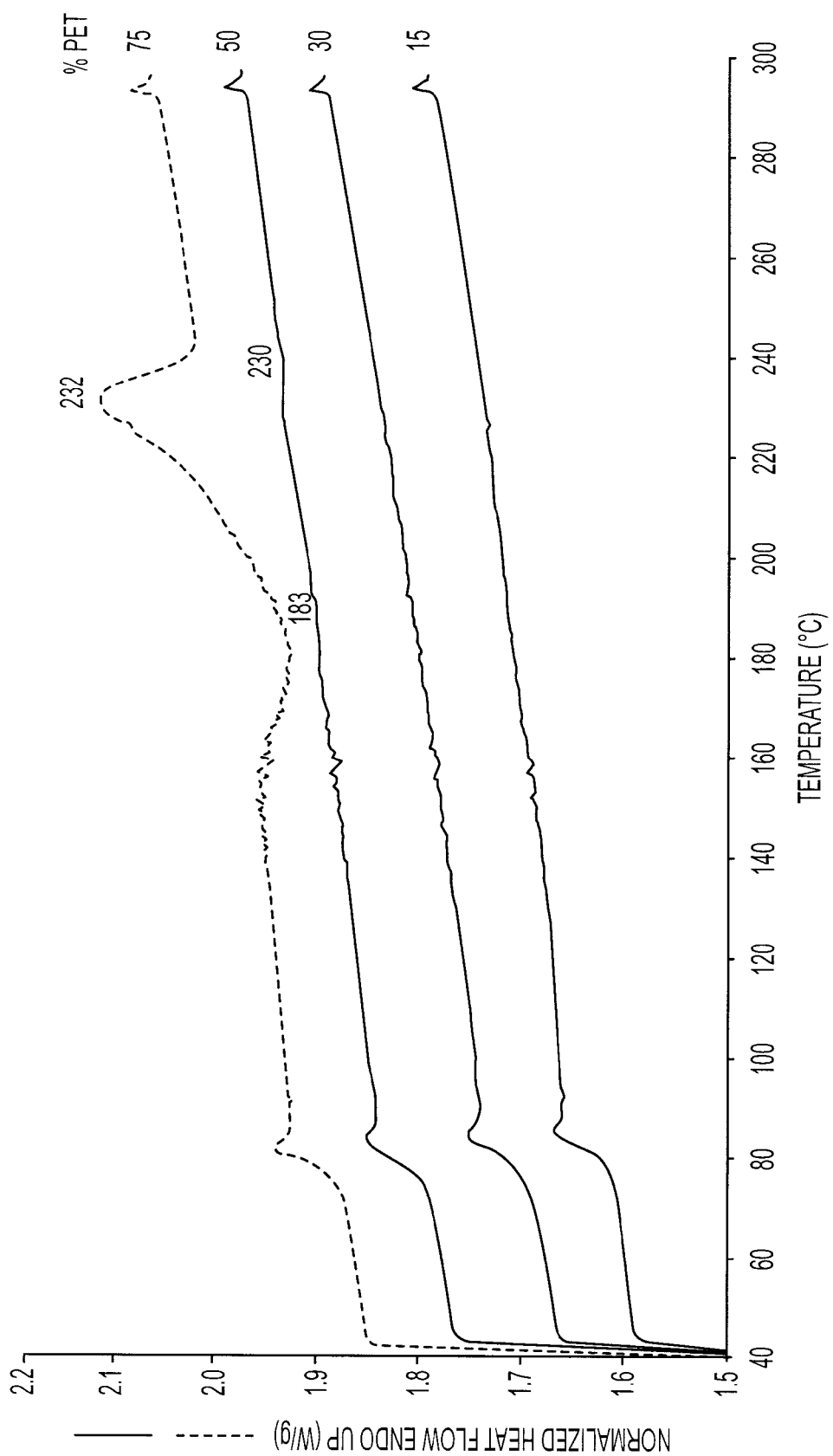

Thermal behavior was also recorded for samples reheated from the quenched amorphous state. An overview of this behavior is shown in the normalized DSC scans of FIG. 26. As can be seen, samples with lower amounts of PET had lower tendency to crystallize than materials containing more PET. The 75% PET blend shows some crystallization and melting behavior, while the blend containing 50% PET shows only a very slight melting endotherm at 230° C. No crystallization or melting behavior is observed for any samples containing less than 50% PET. The glass transition temperatures show very slight decreases as levels of PET are increased.

Figure 27:
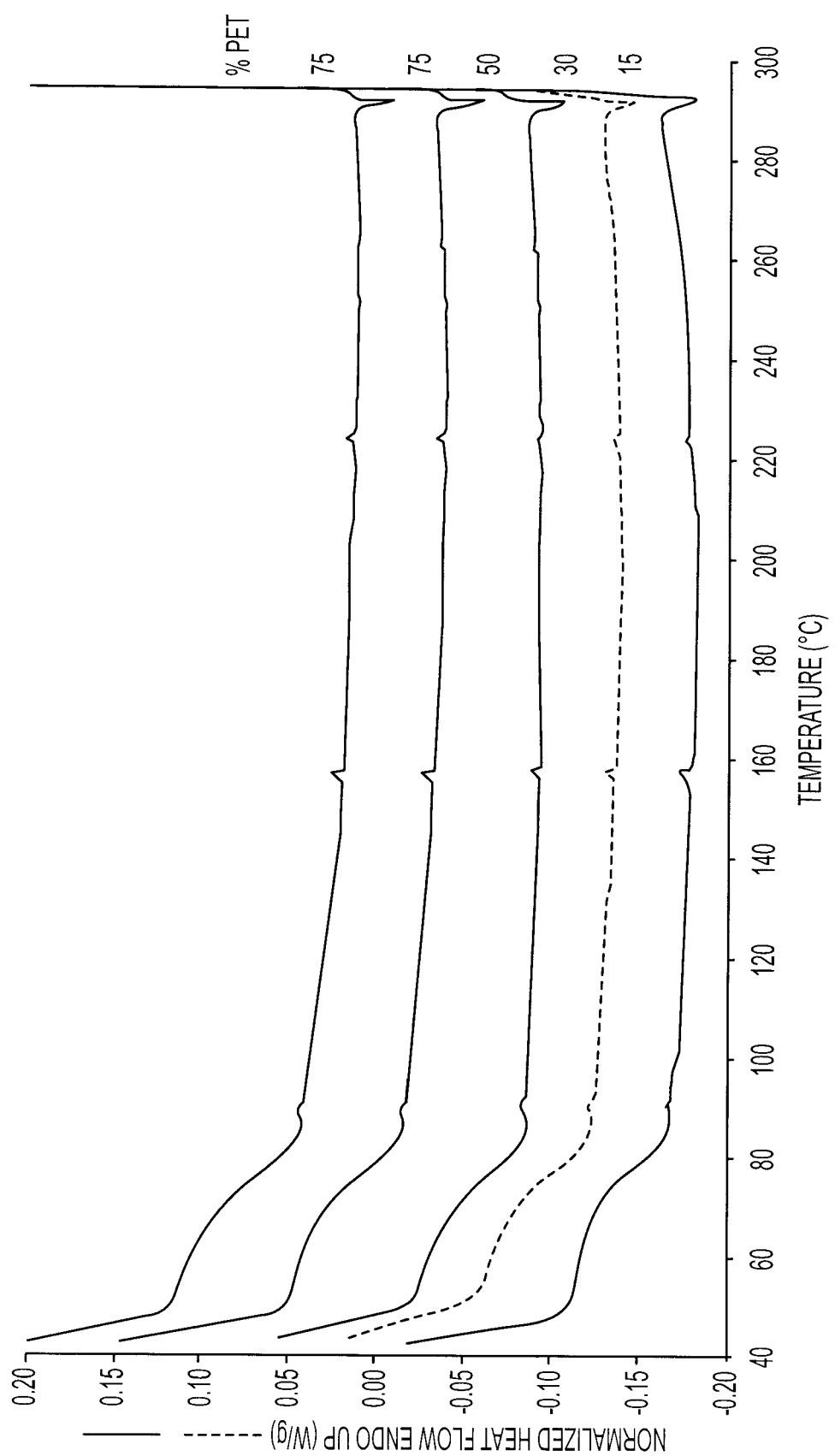

Very little if any crystallization behavior was obtained for samples cooled from the melt as shown in normalized FIG. 27. As can be seen, none of the samples show any significant amount of crystallization while being cooled at 10° C. per minute.

EXAMPLE 3

This example illustrates a polyethylene terephthalate monolayer composition made from a blend of a slow and fast crystallizing PET with the use of a commercial chain extender. Containers were made on a shuttle machine equipped with a 50 mm 25:1 L/D barrier screw. Containers were made from a slow crystallizing PET resin, EB062, and 9921. Similarly containers were also made from a water grade PET WA314 in place of the 9921. Materials were dried extensively to dryness. The crystallizable PET resins were weigh blended using 15% & 30% PET and <1% chain extender

TABLE 4

| Identification | % EB062 | % WA 314 |
|---|---|---|
| 1 Control sidewall | 100 | 0 |
| 1A sidewall | 70 | 30 |
| 1B sidewall | 70 | 30* |
| 1C sidewall | 85 | 15 |
| 1E sidewall | 66 | 34 |
| 2B sidewall | 58 | 42* |
| 2C sidewall | 60 | 40 |
| 2D sidewall | 60 | 40 |
| WA 314 resin | 100 | 0 |
| EB062 resin | 0 | 100 |
| PET - M resin | 0 | 0 |

*40% regrind

EXAMPLE 4

This example illustrates a polyethylene terephthalate multilayer composition. Using the same equipment as in Example 3 multilayer containers were also produced. This was accomplished by using a multilayer die head fed with resin from separate extruders. As in Example 3 containers were made using 9921 and PET WA314 in separate experiments. In one of the experiments the inner and outer layers consisted of battle grade WA314 PET while the middle layer was fed with EB062 with <1% of chain extender CESA Extend from Clariant. The inner and outer layers added to 30% PET with the remainder being EB062. The multilayer container had better clarity than the monolayer container. Dried regrind was introduced into the middle layer with EB062. This effectively raised the crystallizable PET content to 42% in the container wall. The clarity with regrind was very much better than that of the monolayer construction.

Figure 30:
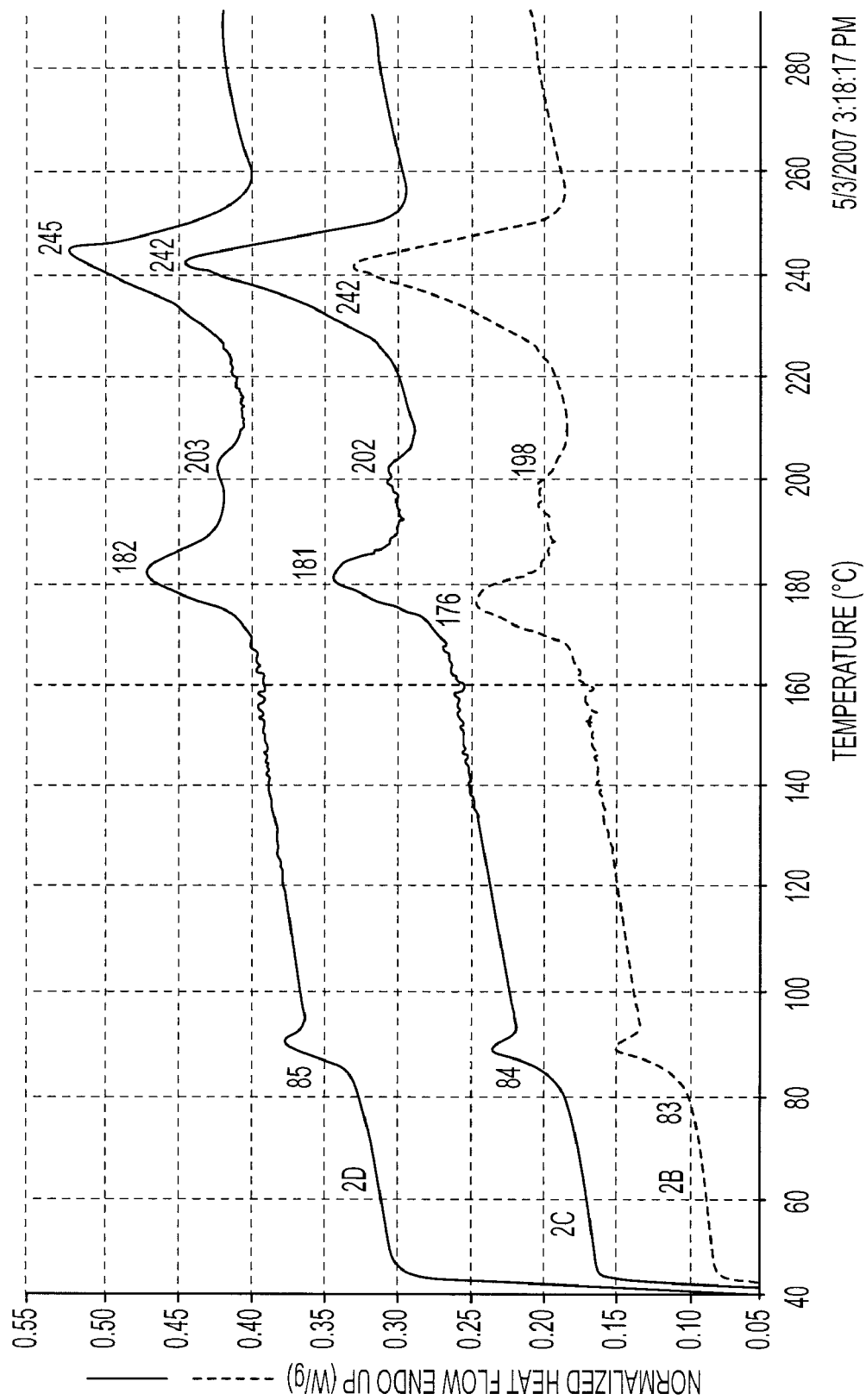
FIG. 30 shows initial thermal transitions, recorded for sections of vacuum dried (2B, 2C, and 2D) bottle wall materials, heated at 10° C. per minute in a DSC.

The side wall from the multilayer container was also analyzed after first vacuum drying at 160° C. The melting temperature for the multilayer container with regrind was 242 with a melting enthalpy of 13 J/g (FIG. 30). Recyclability studies were conducted simulating a PET recycling process. Blends containing up to 30% ground EBM containers in washed clear PET could be dried at 160° C. for 4 hours without clumping in the drier. Further more 30% blends could be easily melt processed and solid stated without sticking in the drier. This confirmed the materials ability to be processed in a PET recycling process even at high loadings in the recycled PET stream.

EXAMPLE 5

This example illustrates the usefulness of precompounded blends to make clear monolayer containers. Precompounded resin made was made from 50% crystallizable PET and EB062 using a twin-screw extruder. The blend had good clarity. Plaques with a 3 mm thickness made from these blends had a haze measurement of less than 5. The blend also demonstrated fast thermal crystallization after one melt history.

Figure 31:
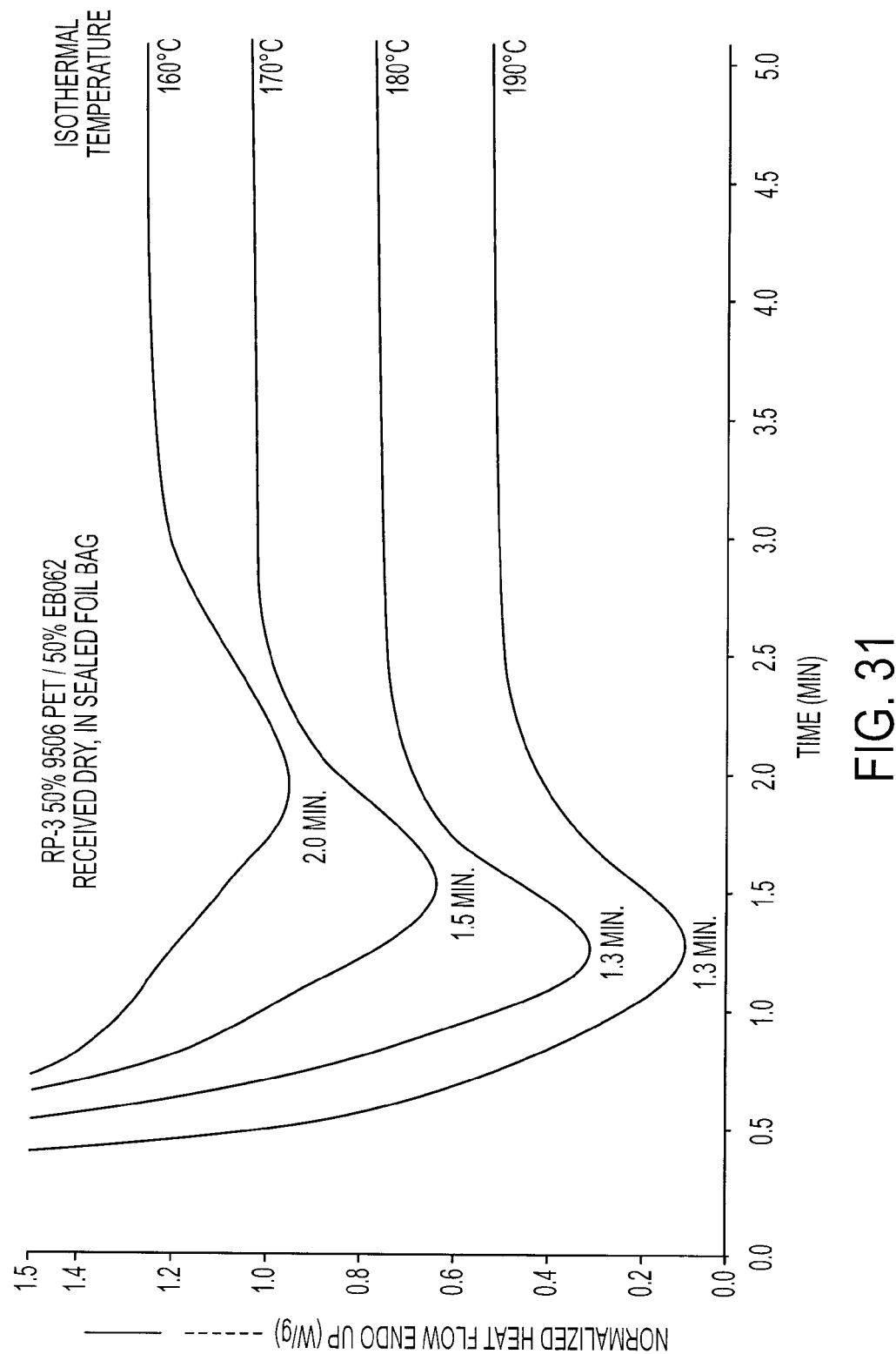
FIG. 31 shows isothermal crystallization of amorphous resin blend at various temperatures.

Furthermore, the blend lent itself to be crystallized in a pre-crystallizer. In one instance a Solid-Air unit made by Bepex International was able to introduce >15% crystallinity within 10 minutes at 180° C. The pre-crystallized PET blend could then be dried in conventional drying equipment to moisture levels of less than 100 ppm with 8 hours of drying. This ability to crystallize after the first melt history is also demonstrated by DSC analysis in FIG. 31. Specifically, FIG. 31 shows a 50% precompounded blend after a single melt history with a residence time of about one minute reaches peak crystallinity when held at 160° C. in 2 minutes. The time to reach peak crystallization is shortened to 1.5 minute as a fresh sample is held at 170° C. At 190° C., the time to reach peak crystallinity is reduced to 1.3 minutes. This data supports the fast crystallization rates observed with the industrial crystallizer from Bepex. In contrast, existing commercial amorphous extrusion blow molding resins, such as EB062, can not be crystallized and/or dried above 80° C., which is the commonly observed glass transition temperature.

The blend was also formulated with branching agents and chain extender PMDA. The compounded blend demonstrated a zero shear viscosity of >4000 Pa·s. This melt strength was suitable for blow molding containers.

The crystalline nature of the blend was advantageous in the blow molding operation. There were no bridging issues in the extruder throat unlike what sometimes observed with using amorphous PET resins. Containers produced from the precompounded blends were clear.

Figure 32:
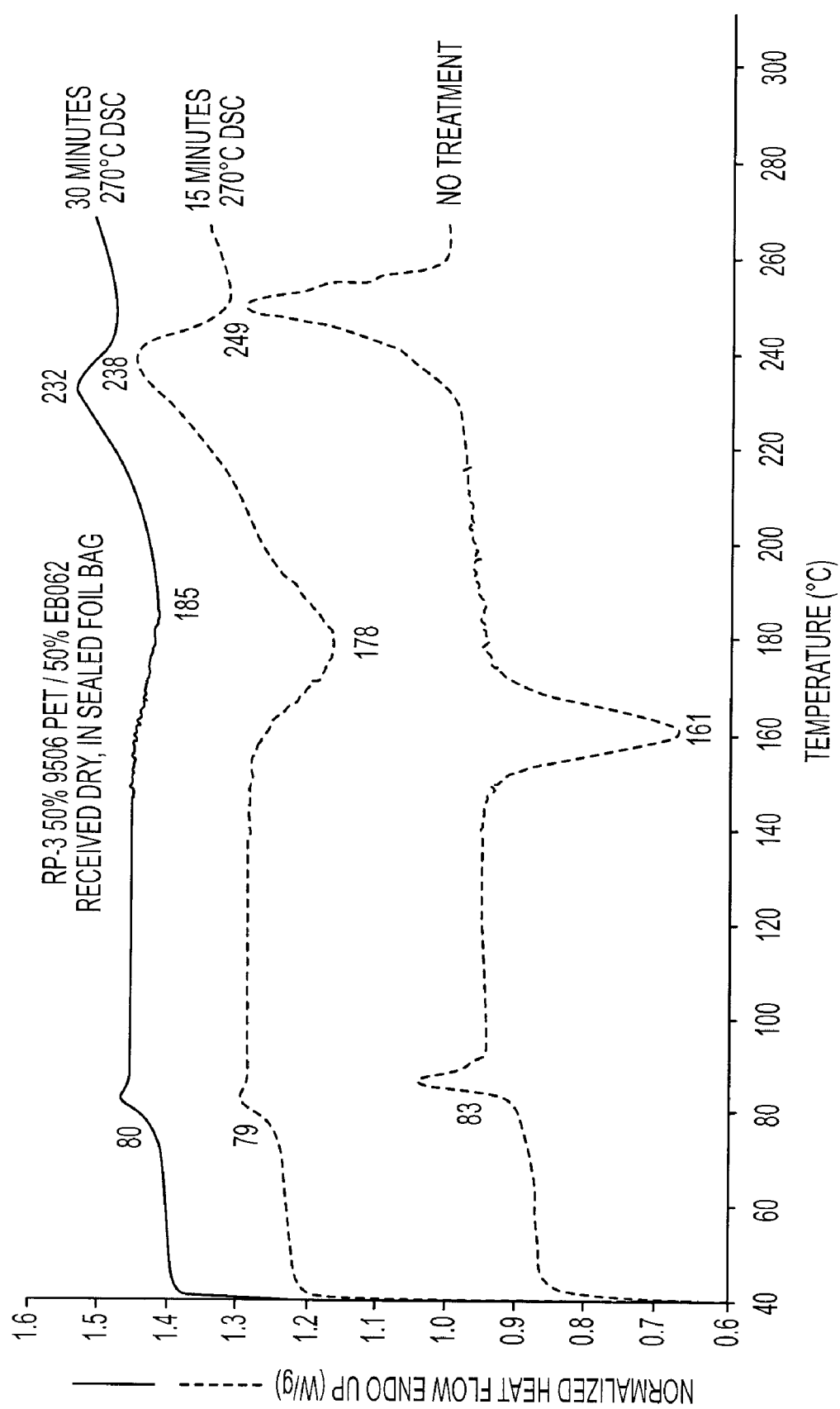
FIG. 32 shows amorphous resin sample containing 50% EB062 heated from the amorphous state at 10° C. in DSC after various exposure times at 270° C.

The precompounded blends ability to crystallize was also demonstrated by DSC analysis. The behavior of a precompounded sample when held for an additional 5 minutes at 270° C., a condition similar to a second melt history in EBM melt processing is shown in FIG. 32. FIG. 32 illustrates although the peak crystallization times are extended at 170° C. and 180° C., crystallization rates are fast enough to prevent sticking in subsequent PET recycling processes. FIG. 32 shows the crystallization behavior of the precompounded blend as received and as a function of longer transesterification times. For example, a precompounded blend containing 50% EB062 compounded in a twin screw extruder with 1 minute of melt processing demonstrated peak crystallization at 161° C. and peak melting at 249° C. The sample held for 15 and 30 minutes shows delayed crystallization peaks and a greater suppression of crystallization rates with time. The longer times are provided to illustrate the point. Fifteen minute residence times are rarely practiced in industry without severe degradation issues, whereas the above-described blends may be suitable for even longer processing times of 30 minutes.

Figure 33:
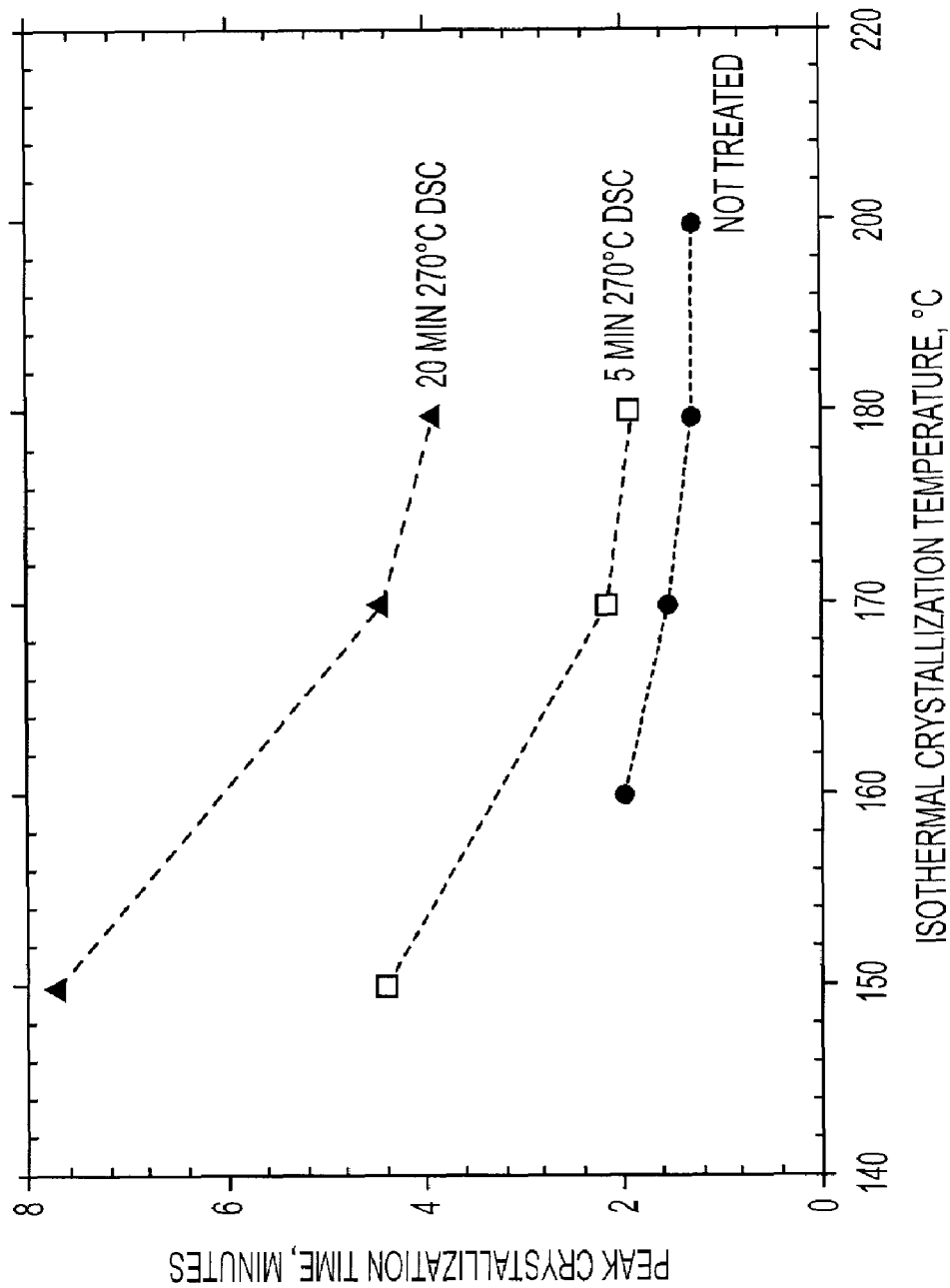
FIG. 33 shows isothermal crystallization for the 50% EB062 blend sample as a function of transesterification.

FIG. 33 provides further evidence that containers produced from these blends as described in this invention should be fully recyclable in the PET recycling stream. FIG. 33 shows resin held at 270° C. for 20 minutes crystallizes in less than 10 minutes when heated to 160° C., reinforcing the fact PET recyclability should not be an issue with such a precompounded formulation.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed:

1. An extrusion blowmolding process comprising:
blending a polyester copolymer base component which develops crystallinity of less than 15% after 15 minutes under isothermal heating and a crystallizable polyester component to form a polyester blend containing the polyester copolymer base component and the crystallizable polyester component in a weight ratio of from about 30:70 to about 70:30;
compounding the polyester blend;
crystallizing and drying the polyester blend, wherein the blend is capable of developing greater than 10% crystallinity and the rate of crystallization is such that amorphous blend pellets can be crystallized to form a crystalline skin which is sufficient to prevent sticking during drying after one melt history; and
forming an article comprising the polyester blend by extrusion blowmolding, wherein the process further comprises recovering tails and moyles of the extruded articles, and drying and reintroducing the tails and moyles as regrind at about 35 wt. % or more into the polyester blend.

2. The extrusion blowmolding process of claim 1 wherein moisture in the dried crystallized blend pellets is less than 100 ppm after 8 hours of drying at 160° C.

3. The extrusion blowmolding process of claim 1 wherein further transesterification during said forming step results in substantially no haze in the extruded article.

4. The extrusion blowmolding process of claim 1 wherein the polyester blend has a melt strength with a zero shear rate viscosity of at least about 1,500 Pa·s.

5. The extrusion blowmolding process of claim 4 wherein melt strength is imparted by at least one of branching, chain extension, and crosslinking 6. The extrusion blowmolding process of claim 5 wherein melt strength is imparted by blending at least one of bifunctional, trifunctional, and polyfunctional additives.

* * * * *